(12) United States Patent
Kwon et al.

(10) Patent No.: US 10,203,799 B2
(45) Date of Patent: Feb. 12, 2019

(54) TOUCH INPUT DEVICE, VEHICLE COMPRISING TOUCH INPUT DEVICE, AND MANUFACTURING METHOD OF TOUCH INPUT DEVICE

(71) Applicant: HYUNDAI MOTOR COMPANY, Seoul (KR)

(72) Inventors: Gideok Kwon, Seoul (KR); Jong Bok Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/259,846

(22) Filed: Sep. 8, 2016

(65) Prior Publication Data

US 2017/0075476 A1  Mar. 16, 2017

(30) Foreign Application Priority Data

Sep. 15, 2015 (KR) .................. 10-2015-0130593
Mar. 18, 2016 (KR) .................. 10-2016-0032639

(51) Int. Cl.

| | | |
|---|---|---|
| G06F 3/041 | (2006.01) | |
| G06F 3/044 | (2006.01) | |
| G06F 3/0354 | (2013.01) | |
| G06F 3/0338 | (2013.01) | |
| B60K 35/00 | (2006.01) | |
| B60K 37/06 | (2006.01) | |
| G06F 3/0488 | (2013.01) | |

(52) U.S. Cl.
CPC ............ *G06F 3/0416* (2013.01); *B60K 35/00* (2013.01); *B60K 37/06* (2013.01); *G06F 3/0338* (2013.01); *G06F 3/03547* (2013.01); *G06F 3/044* (2013.01); *G06F 3/0412* (2013.01); *G06F 3/04883* (2013.01); *B60K 2350/1036* (2013.01); *G06F 2203/04101* (2013.01); *G06F 2203/04102* (2013.01); *G06F 2203/04103* (2013.01); *G06F 2203/04104* (2013.01); *G06F 2203/04809* (2013.01)

(58) Field of Classification Search
CPC ......... B60K 2350/1036; G06F 3/03547; G06F 3/044; G06F 2203/04102
See application file for complete search history.

(56) References Cited

U.S. PATENT DOCUMENTS

| | | | | |
|---|---|---|---|---|
| 2007/0057922 | A1* | 3/2007 | Schultz | G06F 3/03547 345/173 |
| 2014/0267136 | A1* | 9/2014 | Phipps | G06F 3/03547 345/174 |
| 2015/0205424 | A1* | 7/2015 | Park | G06F 3/0414 345/174 |

FOREIGN PATENT DOCUMENTS

| | | |
|---|---|---|
| JP | 2005-199973 A | 7/2005 |
| JP | 2006-029917 A | 2/2006 |
| JP | 2011-031886 A | 2/2011 |

(Continued)

*Primary Examiner* — Xuemei Zheng
(74) *Attorney, Agent, or Firm* — McDermott Will & Emery LLP

(57) ABSTRACT

A touch input device comprising a touch device with which a user is capable of inputting a touch gesture, wherein the touch device includes a base, of which a surface has a concave shape, wherein a depth of the base is gradually increased from an outer portion toward a center portion or is uniformly maintained, a pattern groove formed in the surface of the base, a sense pattern provided in the pattern groove and including a conductive material, a wire for connecting the sense pattern to an integrated circuit, and a coating layer stacked on the base.

19 Claims, 37 Drawing Sheets

(56) References Cited

FOREIGN PATENT DOCUMENTS

| | | | |
|---|---|---|---|
| JP | 2012-124178 | A | 6/2012 |
| JP | 2012-247890 | A | 12/2012 |
| JP | 2014-060048 | A | 4/2014 |
| JP | 2015-092422 | A | 5/2015 |
| KR | 10-2003-0054949 | A | 7/2003 |
| KR | 10-2008-0110477 | A | 12/2008 |

* cited by examiner

TOUCH INPUT DEVICE, VEHICLE COMPRISING TOUCH INPUT DEVICE, AND MANUFACTURING METHOD OF TOUCH INPUT DEVICE

CROSS-REFERENCE TO RELATED APPLICATION

This application claims the benefit of priority to Korean Patent Application Nos. 10-2015-0130593 and 10-2016-0032639, filed on Sep. 15, 2015 and Mar. 18, 2016, respectively, in the Korean Intellectual Property Office, the disclosure of which is incorporated herein by reference.

TECHNICAL FIELD

Embodiments of the present disclosure relate to a touch input device, a vehicle including a touch input device, and a manufacturing method of a touch input device, and more particularly, to a touch input device formed by installing an electrode using laser machining, a vehicle including the same, and a manufacturing method thereof.

BACKGROUND

In general, with the development of electronic communication techniques, various electronic devices have been manufactured. In these electronic devices, the aesthetics of the design in addition to user convenience in manipulation are becoming important. Therefore, it is important to change designs of input devices represented by keyboards or key pads to various types of devices.

The input devices are used in various types of display systems such as portable terminals, notebooks, smartphones, smart pads, smart TV's, and the like, which provide and gather information to and from users. Recently, with the development of electronic devices, in addition to a method of inputting a command signal using manipulation keys, dials, or the like, a method of inputting a command signal by touching has been used.

A touch input device, which is an input device which provides interfaces between communication devices using various displays and users, allows the user to interface between the communication device and the user by being in contact with or close to a touchpad or a touch screen using an input means such as a finger or a touch pen.

Since the touch input device is used by all ages via input means such as the finger or the touch pen, the touch input device has been used in various devices such as automated teller machines (ATMs), personal digital assistant (PDAs), mobile phones, and the like, and has been used in various fields such as banking, government usage, tourist assistance, transportation assistance and the like.

Recently, there has been an effort to apply the touch input device to health or medical related products and vehicles. Specifically, since the touch panel may be used with the touch screen or may be individually used in the display system, the utilization thereof is increasing. Also, recently, in addition to a function of moving a point using the touch, a function capable of entering a gesture has been developed. In the touch input device capable of entering the gesture, efforts to improve the recognition rate of the gesture is ongoing.

As a method of implementing the touch input device in which touch manipulation is possible, a resistance method, a capacitance method, a surface ultrasonic method, a transmitter method and the like have been used. In the touch input device using the capacitance method, electrode patterns are formed in a direction crossing each other, a change of the capacitance between the electrodes is detected when an input means such as a finger and the like is in contact with the electrode patterns, and thus a position of inputting is detected. Alternatively, the same potential having the same phase is applied to both ends of transparent conductive film. A weak current, which flows when the input means such as a finger and the like is in contact with or close to the device and the capacitor is formed, is detected, and thus a position of inputting may be detected.

In general, the touch input device has a two-panel-layered structure in which a first panel, which connects first sense patterns arranged on a first substrate in a first direction (e.g., an x-axis direction) to a sensor circuit for calculating positions of the sense patterns and includes a plurality of first metal patterns, and a second panel, which connects second sense patterns arranged on a second substrate in a second direction (e.g., a y-axis direction) to a sensor circuit for calculating positions of the sense patterns and includes a plurality of second metal patterns, are bonded using an adhesive.

Also, as a method of manufacturing the touch input device, a method of using indium tin oxide (ITO) as a transparent electrode for applying to the touch panel, a method of using a metal mesh, a method of using a flexible printed circuit board (FPCB), and the like are used.

However, the above-described processes are complicated due to the plurality of processing steps, and there is a problem in that the process costs are high. Specifically, since rare earth materials are used in a process of manufacturing using ITO, there is a problem in that the price of the product due to the expensive materials is high.

Also, since the existing processes use a bonding method, there is a problem of vulnerability to external vibrations or shock and high heat. Therefore, the durability of the product is reduced, and it may be difficult to apply to the devices having vibration and high heat.

SUMMARY

Therefore, it is an aspect of the present disclosure to provide a touch input device in which the sense of operation or touch is improved when a user enters a gesture, a vehicle including the touch input device, and a manufacturing method of the touch input device. Also, it is another aspect of the present disclosure to provide a touch input device in which the user intuitively and accurately inputs a gesture even when the user's eyes are not focused on the touch input device, a vehicle including the same, and a manufacturing method thereof.

Also, it is still another aspect of the present disclosure to provide a touch input device capable of forming an electrode of the touch input device without the use of a bonding method, and a manufacturing method thereof.

In accordance with one aspect of the present disclosure, a touch input device includes a touch device with which a user is capable of inputting a touch gesture. The touch device includes a base, of which a surface has a concave shape, wherein a depth of the base is gradually increased from an outer portion toward a center portion or is uniformly maintained, a pattern groove formed in the surface of the base, a sense pattern provided in the pattern groove and including a conductive material, a wire which connects the sense pattern to an integrated circuit, and a coating layer stacked on the base.

Also, the base may include a metal composite.

Also, the base may include a first base and a second base stacked thereon, the pattern groove may include a first pattern groove formed in a surface of the first base and a second pattern groove formed in a surface of the second base, and the sense pattern may include a first sense pattern provided in the first pattern groove and a second sense pattern provided in the second pattern groove.

Also, the first pattern groove and the second pattern groove may vertically cross with the second base therebetween.

Also, the base may include a resin containing at least one of polycarbonate (PC), polyamide (PA), and an acrylonitrile-butadiene-styrene (ABS) copolymer, and a metal oxide containing at least one of Mg, Cr, Cu, Ba, Fe, Ti, and Al.

Also, the base may be coated on a plastic or glass.

Also, the pattern groove may include a first pattern groove formed in a surface of the base and a second pattern groove formed in a back surface of the base, and the sense pattern may include a first sense pattern provided in the first pattern groove and a second sense pattern provided in the second pattern groove.

Also, the pattern groove may include a first pattern groove and a second pattern groove, which are formed in a surface of the base, the sense pattern may include a first sense pattern provided in the first pattern groove and a second sense pattern provided in the second pattern groove, and the first sense pattern and the second sense pattern may be disposed spaced apart from each other.

Also, the touch device may include a concave curved surface shape, of which a gradient is decreased toward a center portion thereof.

Also, the base may include a shape of a portion of a spherical surface.

Also, the touch device may include a gesture input device located at a center thereof, and a swiping input located along an outer edge of the gesture input device. The gesture input device and the swiping input may receive separate touch signals.

Also, the gesture input device may be provided in a circular shape, and the swiping input may be provided to surround a circumferential rim of the gesture input device.

Also, the swiping input may be provided to be inclined downward toward the gesture input device.

Also, the gesture input device and the swiping input may be integrally formed.

Also, the sense pattern may be provided to cover the gesture input device and the swiping input.

Also, the gesture input device and the swiping input may receive a touch signal using the same sense pattern, and signals may be separately recognized based on a boundary between the gesture input device and the swiping input.

In accordance with another aspect of the present disclosure, a vehicle includes the touch input device, a display device, and a controller which operates the display device according to an input signal input to the touch input device.

Also, the controller may convert a gesture input to the touch input device into an input signal, and transmit an operation signal such that an operation indicated by the input signal is displayed on the display device.

Also, the touch input device may be installed in a gearbox.

In accordance with still another aspect of the present disclosure, a method of manufacturing a touch input device includes providing a base including a metal composite, wherein a surface of the base is provided to have a depth, which is gradually increased from an outer portion toward a center portion or uniformly maintained, irradiating the surface of the base with a laser to form a pattern groove, forming a sense pattern in the pattern groove through a plating or deposition process, wherein a first sense pattern and a second sense pattern, which are disposed to be spaced apart are formed, and after a current is provided to the first and second sense patterns, detecting a change of mutual capacitance between the two sense patterns, and determining whether the touch input device is usable or not as a sensor.

Also, the step of providing the base may include providing a first base and a second base stacked on the first base, the forming of the pattern groove includes irradiating a surface of the first base with a laser to form a first pattern groove, and irradiating a surface of the second base with a laser to form a second pattern groove, and the step of forming the sense pattern includes plating or depositing the first sense pattern on the first pattern groove, and plating or depositing the second sense pattern on the second pattern groove.

Also, the step of forming the pattern groove may include irradiating the surface of the base with a laser to form a first pattern groove, and irradiating a back surface of the base with a laser to form a second pattern groove, and the step of forming the sense pattern includes plating or depositing the first sense pattern on the first pattern groove, and plating or depositing the second sense pattern on the second pattern groove.

Also, the step of forming the pattern groove may include irradiating the surface of the base with a laser to form a first pattern groove and a second pattern groove, and the step of forming the sense pattern includes plating or depositing the first sense pattern on the first pattern groove, and plating or depositing the second sense pattern disposed spaced apart from the first sense pattern on the second pattern groove.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 13 is a top view illustrating a gesture input state, FIG. 14 is a top view illustrating a swiping input state, and FIG. 15 is a top view illustrating a pressing input state;

FIG. 23 illustrates a process of preparing a first base, FIG. 24 illustrates a process of forming a first pattern groove, FIG. 25 illustrates a process of forming a first sense pattern, FIG. 26 illustrates a process of stacking a second base, FIG. 27 illustrates a process of forming second pattern grooves, FIG. 28 illustrates a process of forming second sense patterns, and FIG. 29 illustrates a process of stacking a coating layer.

DETAILED DESCRIPTION

Figure 1:
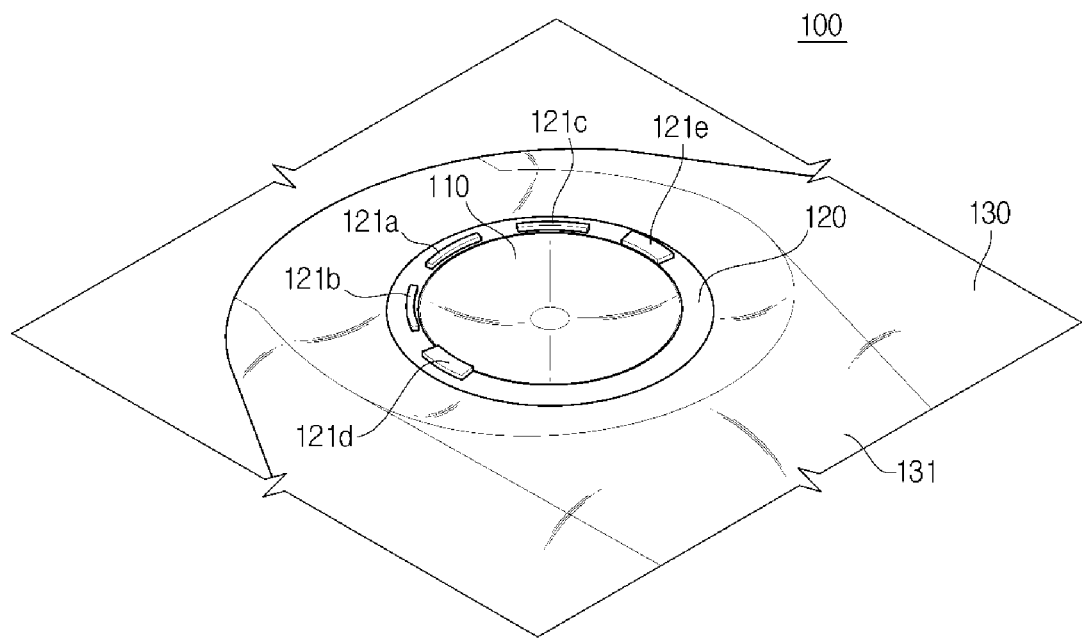
FIG. 1 is a perspective view illustrating a touch input device in accordance with a first embodiment of the present disclosure.

Hereinafter, embodiments of the disclosure will be described in detail with reference to the accompanying drawings. The embodiments to be described below serve only to fully convey the scope of the disclosure to those skilled in the art, but the disclosure is not limited thereto. The disclosure may be described or practiced using other embodiments. Components irrelevant to description in the drawings may be omitted in order to clearly describe the disclosure, and sizes and the like of components may be exaggerated to aid understanding of the disclosure.

FIG. 1 is a perspective view illustrating a touch input device 100 in accordance with a first embodiment of the present disclosure.

As shown in FIG. 1, the touch input device 100 in accordance with the first embodiment of the present disclosure may include a touch device 110 installed on a mounting surface 130.

The touch device 110 may be provided as a predetermined region in which a touch signal may be input by a user. For example, as illustrated in the drawings, the touch device 110 may be provided in a circular shape in a plan, or top view. Alternatively, the touch device 110 may be provided in various shapes including an elliptical shape or any other shape in a plan view.

The touch device 110 may be a touchpad, to which a signal is input when a user is in contact with or approaches the touch pad using his or her finger or a pointer such as a touch pen or the like. The user may enter a predetermined touch gesture to input a desired instruction or command into the touch device 110.

The touchpad may include a touch film, a touch sheet, or the like including a touch sensor. Also, the touchpad may include a touch panel, which may be a display device of which a screen is touchable.

Meanwhile, a position of the pointer that is recognized while the pointer is close to the touchpad without being in contact with the touchpad is referred to as a "proximity touch," and the position of the pointer that is recognized when the pointer is in contact with the touchpad is referred to as a "contact touch." In this case, the position recognized in the proximity touch may be a position at which the pointer vertically corresponds to the touchpad when the pointer is close to the touchpad.

The touchpad may be provided using a resistive film method, an optical method, a capacitance method, an ultrasonic method, a pressure method, and the like. That is, the touchpad provided may use known methods.

The touch device 110 may be installed inside of a rim device 120. The rim device 120 may refer to a portion which surrounds the periphery of the touch device 110, and may be provided as a member different from the touch device 110. Also, the rim device 120 may be integrally formed with the mounting surface 130, or may be a separate member provided between the mounting surface 130 and the touch device 110. Also, the rim device 120 may be omitted. In this case, the touch device 110 may be directly installed inside of the mounting surface 130.

Key or touch buttons 121 (121a, 121b, 121c, 121d and 121e) which surround the touch device 110 may be disposed on the rim device 120. The user may enter a gesture on the touch device 110, and may input a signal using the buttons 121 provided on the rim device 120 on the periphery of the touch device 110.

The touch input device 100 in accordance with the first embodiment of the present disclosure may further include a wrist support device 131 which may be located under the touch device 110 to support a wrist of the user. In this case, a support surface of the wrist support device 131 may be disposed higher than a touch surface of the touch device 110. Thus, the wrist may be prevented from being folded back when the user enters a gesture on the touch device 110 using his or her finger while supporting the wrist on the wrist support device 131. Therefore, musculoskeletal disorders of the user, which may occur due to the repeated touch input processes, may be prevented, and a more comfortable sense of operation may be provided.

For example, as illustrated in the drawing, the wrist support device 131 may be integrally formed with the mounting surface 130 so as to protrude from the mounting surface 130. Alternatively, the wrist support device 131 may be a separate member provided on the mounting surface 130.

Figure 2:
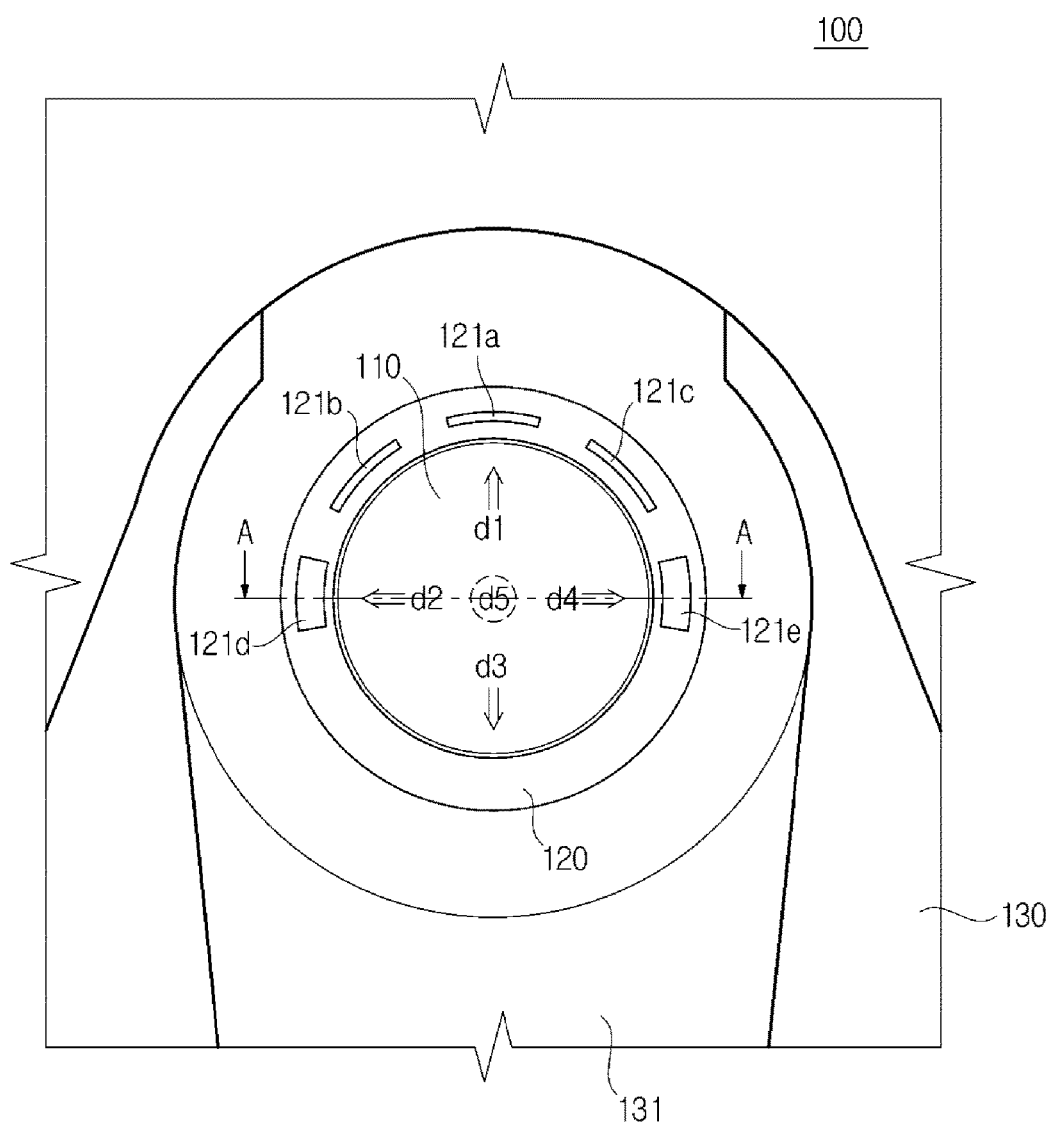
FIG. 2 is a top view illustrating a touch input device in accordance with the first embodiment of the present disclosure.

FIG. 2 is a plan, or top, view illustrating the touch input device 100 in accordance with the first embodiment of the present disclosure.

As shown in FIG. 2, the touch input device 100 in accordance with the first embodiment of the present disclosure may include a controller which detects a gesture signal input to the touch device 110, analyzes the gesture signal and issues commands to various devices.

The controller may move a cursor or menu displayed on a display device (not illustrated) according to a position of the pointer moving on the touch device 110. That is, when the pointer moves from an upper portion of the touch device 110 to a lower portion thereof, the cursor displayed on the display device may be moved in the same direction as the pointer, or a pre-selected menu may be moved from a top menu to a bottom menu.

Also, the controller may analyze a trajectory in which the pointer moves to correspond to a predetermined gesture, and execute a command defined for the corresponding gesture. The gesture may be entered by operating the pointer through flicking, rolling, spinning or tapping. In addition, the user may enter the gesture using various touch input methods.

Here, flicking refers to a touch input method in which a contact state is released after a pointer moves in one direction while the pointer is in contact with the touch device 110. Rolling refers to a touch input method in which a circular arc is drawn about the center of the touch device 110. Spinning refers to a touch input method in which a circle is drawn about the center of the touch device 110. Tapping refers to a touch input method in which the touch device 110 is tapped.

Also, the user may input the gesture using a multiple pointers input method. The multiple pointers input method may refer to a method in which a gesture is entered while two pointers are simultaneously or sequentially in contact with the touch device 110. For example, the gesture may be entered while two fingers touch the touch device 110. Using the multiple pointers input method, various commands or instructions that can be entered by the user may be provided.

The various touch input method may include a method in which any gesture is entered as well as a method in which a gesture such as a number, a letter, a symbol, or the like is entered. For example, the user may enter a command by drawing directly Hangeul consonants and vowels, English alphabet letters, digits, arithmetic symbols, or the like on the touch device 110. As the user directly enters a letter, a number, or the like to be input on the display device instead of selecting the letter, the number, or the like from the touch device 110, an input time may be reduced and a more intuitive interface may be provided.

The touch device 110 may be provided to enable a pressing operation or a tilting operation. As the user presses a portion of the touch device 110 or tilts the touch device 110 by applying a pressure to the touch device 110, the user may input an execution signal corresponding thereto. Here, the pressing operation may include an operation in which the touch device 110 is pressed in parallel and an operation in which the touch device 110 is pressed to be tilted. Also, when the touch device 110 is provided to be flexible, a portion of the touch device 110 only may be pressed.

For example, the touch device 110 may be tilted in at least one of directions d1 to d4 based on a direction perpendicular to the touch surface. For example, as illustrated in FIG. 2, the touch device 110 may be tilted in front, rear, left and right directions dl to d4. Of course, in some embodiments, the touch device 110 may be provided to be tilted in more, or other, directions than these directions. Also, when a center portion d5 of the touch device 110 is pressed, the touch device 110 may be pressed in parallel.

The user may enter a predetermined instruction or command by applying a pressure to the touch input device 100 and pressing or tilting the touch input device 100. For example, the user may select a menu or the like by pressing the center portion d5 of the touch device 110, and/or may move a cursor upward by pressing an upper portion dl of the touch device 110.

In addition, the touch input device 100 may further include a button input 121. The button input 121 may be located on the periphery of the touch device 110, for example, may be installed in the rim device 120. The user may manipulate the button without moving a position of his or her hand while entering a gesture, and thus may rapidly issue an operation command.

The button input 121 may include a touch button and a physical button. The touch button inputs a signal of only touch of the pointer and the physical button inputs a signal while a shape thereof is deformed by physical external force. The physical button may include, for example, a clickable button and a tiltable button.

In the drawing, five buttons 121 (121*a*, 121*b*, 121*c*, 121*d* and 121*e*) are illustrated. For example, the buttons 121 may include a home button 121*a* for moving to a home menu, a back button 121*d* for moving from a current screen to a previous screen, an option button 121*e* for moving to an option menu, and two shortcut buttons 121*b* and 121*c*. The shortcut buttons 121*b* and 121*c* may be buttons for moving directly to menus frequently used by the user and to designated devices.

Meanwhile, although not illustrated in the drawings, various parts related to operations may be embedded inside of the touch input device 100. Structures in which the touch device 110 may be pressed or tilted in the above-described five directions dl to d5 may be included inside of the touch input device 100. Although these structures are omitted in the drawings, they are easy to implement using techniques conventionally used in the art.

Also, various semiconductor chips, printed circuit boards, and the like may be installed inside of the touch input device 100. Meanwhile, the semiconductor chips may be mounted on the printed circuit boards. The semiconductor chips perform information processing and/or store data. The semiconductor chip may analyze a predetermined electrical signal generated according to external forces applied to the touch input device 100, the gesture recognized by the touch device 110, or the button 121 provided in the touch input device 100, generate a predetermined control signal according to the analyzed contents, and then transmit the predetermined control signal to a controller or display device of the other device.

Figure 3:
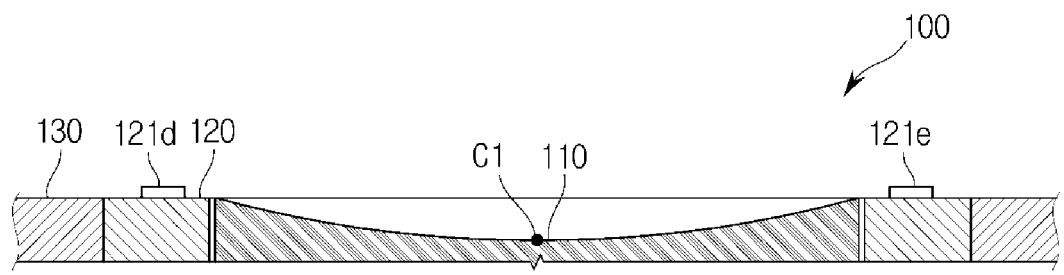
FIG. 3 is a cross-sectional view taken along line A-A of FIG. 2.

FIG. 3 is a cross-sectional view taken along line A-A of FIG. 2.

As shown in FIG. 3, the touch device 110 may include a portion lower than a boundary with the rim device 120 or the mounting surface 130. That is, the touch surface of the touch device 110 may be located lower than a boundary between the touch device 110 and the rim device 120. For example, the touch device 110 may be provided so as to be inclined down from the boundary with the rim device 120, or may be stepped at the location of the boundary with the rim device 120. For example, as illustrated in FIG. 3, the touch device 110 in accordance with the first embodiment of the present disclosure includes a curved surface device having a concave surface shape.

Meanwhile, in the drawing, the touch device 110 is illustrated so as to be inclined continuously downward from the boundary with the rim device 120 without steps. However, alternatively, the touch device 110 may be provided so as to be stepped and inclined downward from the boundary with the rim device 120.

As the touch device 110 includes the portion lower than the boundary with the rim device 120, it is possible for the user to recognize a region and boundary of the touch device 110 by a sense of touch. When the gesture is entered in the center portion of the touch device 110, a recognition rate may be increased. Also, even in the case in which similar gestures are entered, when the gestures are entered at different positions, there is a risk of being recognized as different commands from each other. The problem is that the user enters the gesture without focusing his or her eyes in the touch region. In the case in which the user enters the gesture while looking at the display device or focusing on external circumstances, when the user can intuitively recognize the touch region and the boundary therewith by the sense of touch, it may be advantageous in that the user enters the gesture at an accurate position. Therefore, the input accuracy of the gesture is improved.

The touch device 110 may include a concave shape. Here, the concave shape may refer to a recessed or depressed shape, and may include an inclined shape or a stepped, concave shape and/or a roundly concave shape.

Also, the touch device 110 may include a concave curved surface shape. For example, as illustrated in the drawing, the touch device 110 in accordance with the first embodiment of the present disclosure is provided as a concave curved surface having a constant curvature. That is, the touch device 110 may include a shape of an inner portion of a spherical surface. When the curvature of the touch device 110 is constant, a heterogeneous sense of operation when the user enters the gesture on the touch device 110 may be minimized.

Also, the touch device 110 includes a concave shape, and may be provided such that a depth thereof is gradually increased from an outer portion to the center portion or remains uniform. That is, the touch device 110 may be provided so as not to include a convex surface. When the touch device 110 includes the convex surface, since a trajectory in which the user can naturally draw a gesture and the curvature of the touch surface are changed, an accurate touch input may become difficult. The touch device 110 illustrated in FIG. 1 may be provided such that the depth thereof is largest at a center C1 thereof, and the curvature thereof is gradually decreased to a predetermined curvature from the outer portion to the center C1.

Meanwhile, the convex surface may not mean a convex point in a local region, but may mean a convex region in the entire touch region of the touch device 110. Therefore, the touch device 110 in accordance with the embodiment of the present disclosure may include a protrusion formed at the center thereof by extrusion molding so that the user can directly feel a position of the center portion by feeling a small protrusion, a thin fold having a concentric circle shape which protrudes from the touch device 110, or the like.

Alternatively, the curved surface of the touch device 110 may be provided to have different curvatures. For example, the touch device 110 may include a concave curved surface shape, of which a gradient is gradually decreased closer to the center portion thereof. That is, the touch device 110 may be provided such that a curvature of a region close to the center portion is small (meaning a radius of curvature is large) and a curvature of a region away from the center portion, that is, a curvature of the outer portion is large (meaning that a radius of curvature is small). In this manner, as the curvature of the center portion of the touch device 110 is smaller than that of the outer portion thereof, it may be easy to enter a gesture on the center portion using the pointer. Since the curvature of the outer portion is greater than that of the center portion, the user touches the outer portion to detect the curvature thereof, and thus may easily recognize the position of the center portion even when the user is not looking at the touch device 110.

In the touch input device 100 in accordance with the first embodiment of the present disclosure, the touch device 110 may include the concave curved surface, and thus the sense of touch (or sense of operation) felt by the user when inputting the gesture may be increased. The curved surface of the touch device 110 may be provided similar to a trajectory drawn by movement of a fingertip when a human performs an operation such as moving his or her finger while his or her wrist is fixed, or rotating or twisting the wrist while the finger is extended As the embodiment of the present disclosure, the touch device 110 including the concave curved surface may be ergonomic compared to a generally flat touch device. That is, the senses of touching and operating of the user may be improved but the fatigue caused by exertion of the wrist or the like may be reduced. The input accuracy may be improved compared to the case in which the gesture is entered on the flat touch device.

Also, the touch device 110 may be provided in a circular shape. When the touch device 110 is provided in the circular shape, it is easy to form a concave curved surface. Since the user can detect a circular-shaped touch region of the touch device 110 by the sense of touch as the touch device 110 is provided in the circular shape, the user may enter a circular-shaped gesture operation such as rolling or spinning.

Also, as the touch device 110 is provided to have the concave curved surface, the user may intuitively know a position of the touch device 110 at which the finger is located. As the touch device 110 is provided to have a curved surface, a gradient is relatively changing at any point of the touch device 110. Therefore, the user may intuitively know a position of the touch device 110 at which the finger is located through the sense of inclination felt by the finger.

When the user enters a gesture on the touch device 110 while the user fixes his or her eyes to places other than the touch device 110, the above characteristics may provide feedback of a position of the touch device 110 on which the finger is placed and help the user to enter a desired gesture, and thus the input accuracy of the gesture may be improved. For example, when the user feels that the gradient of the touch device 110 conveyed to the finger is flat, the user may intuitively know that he or she is touching the center portion of the touch device 110 and the user may intuitively know any direction from the center portion on which the finger is placed by sensing a direction of the gradient of the touch device 110 conveyed to the finger.

Meanwhile, a diameter and depth of the touch device 110 may be determined in an ergonomic design range. For example, the diameter of the touch device 110 may be selected from within a range of 50 mm to 80 mm. Considering an average length of fingers of adults, a range in which the finger can move once with only natural movement of the finger while the wrist is fixed may be selected within 80 mm. In the case in which the diameter of the touch device 110 is more than 80 mm, when the user draws a circle along the edge of the touch device 110, the movement of the hand becomes unnatural and the wrist is used more than necessary.

On the other hand, when the diameter of the touch device 110 is less than 50 mm, an area of the touch region is decreased, and thus the diversity of the gestures that can be input may be reduced. Also, the gesture is drawn in a narrow region, and thus the gesture input error rate may be increased.

Also, when the touch device 110 is provided in a spherical shape, a value obtained by dividing the depth of the touch device 110 by the diameter thereof may be selected from a range of 0.04 to 0.1. The value obtained by dividing the depth of the touch device 110 by the diameter thereof refers to a degree in which the curved surface is curved. That is, in touch devices 110 having the same diameter, as the value obtained by dividing the depth by a diameter thereof is increased, the touch device 110 has a more concave shape, and on the other hand, as the value obtained by dividing the depth by a diameter thereof is decreased, the touch device 110 has a more flat shape.

When the value obtained by dividing the depth of the touch device 110 by the diameter thereof is greater than 0.1, the curvature of the concave shape is increased, and thus the sense of touch of the user is reduced. The curvature of the touch device 110 preferably matches the curvature of a curved line drawn by the fingertip when the finger of the user naturally moves. On the other hand, when the value obtained by dividing the depth by the diameter is greater than 0.1, the user may feel an unnatural sense of operation when the user moves the finger along the touch device 110. When the user unconsciously and naturally moves the finger, the touch device 110 may be separated from the fingertip. In this case, the touch of the gesture is disconnected, and thus recognition errors may occur.

On the other hand, when the value obtained by dividing the depth of the touch device 110 by the diameter thereof is smaller than 0.04, it may be difficult for the user to feel the difference of the sense of operation compared to the case in which the user draws the gesture on the flat touch device.

Meanwhile, the touchpad used in the touch device 110 having the curved surface may detect touching using an optical method. For example, an infrared light-emitting diode (IR LED) and a photodiode array may be disposed on a back surface of the touch device 110. The IR LED and photodiode may obtain an infrared image reflected by the finger, and the controller may extract a touching point from the obtained image.

Figure 4:
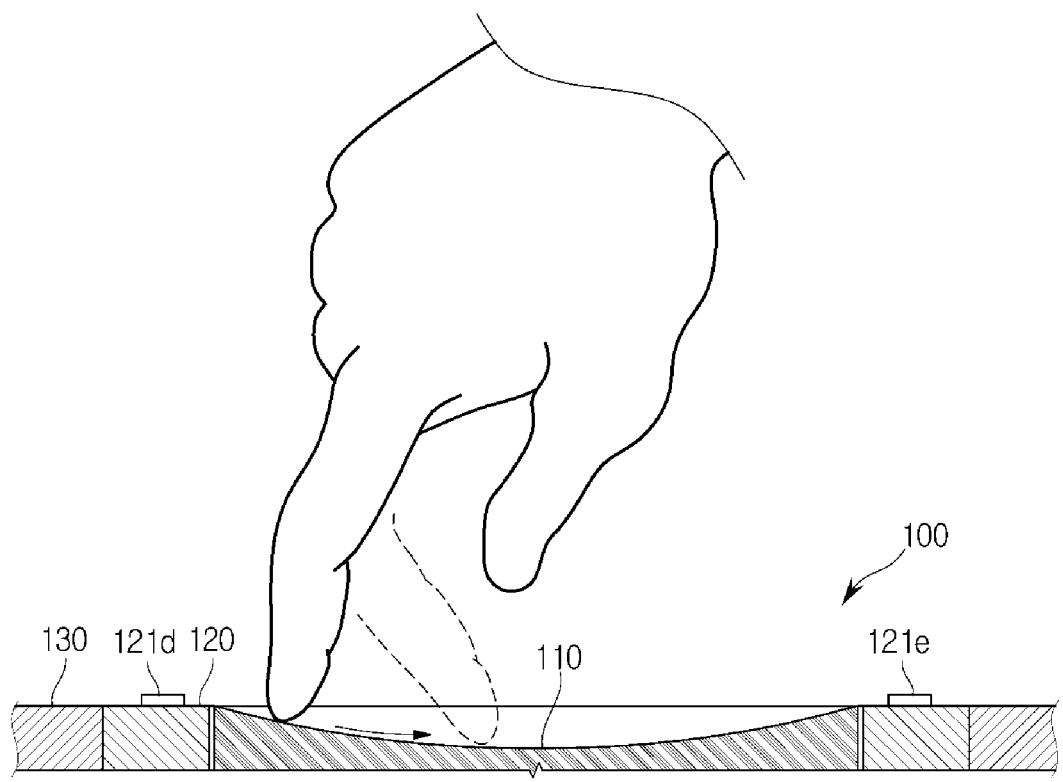
FIG. 4 is a view illustrating a finger trajectory when a user inputs a gesture in a vertical direction according to an embodiment of the present disclosure.
Figure 5:
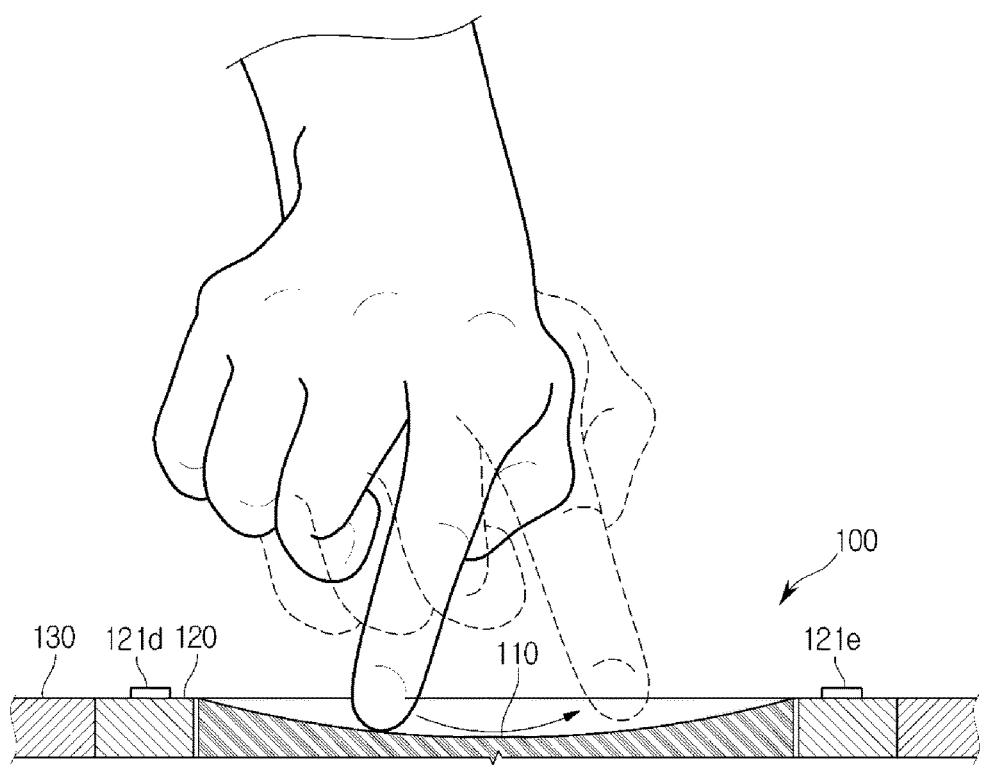
FIG. 5 is a view illustrating a finger trajectory when a user inputs a gesture in a horizontal direction according to an embodiment of the present disclosure.

FIG. 4 is a view illustrating a finger trajectory when a user enters a gesture in a vertical direction, and FIG. 5 is a view illustrating a finger trajectory when a user enters a gesture in a horizontal direction.

As shown in FIGS. 4 and 5, the touch device 110 in accordance with the embodiment of the present disclosure may include a concave curved surface. In this case, a curvature of the touch device 110 may be determined such that the user feels comfortable when the user enters a gesture. Referring to FIG. 4, when the user moves the finger in the vertical direction, the user may enter a gesture with only the natural movement of the finger in a state in which the user moves or does not bend joints other than the finger. In the same manner, referring to FIG. 5, when the user moves the finger in the horizontal direction, the user may enters the gesture with only the natural movement of the finger and the wrist in a state in which the user does not excessively twist the wrist. Thus, as the shape of the touch device 110 is ergonomically designed, fatigue of the user may be reduced, even when used for a long time, and skeletal disorders, which can occur in the wrist or the other joints, may be prevented.

The touch device 110 in accordance with the embodiment of the present disclosure may include a center portion and an outer portion having different gradients or curvatures. When the touch device 110 is provided to have a flat or inclined surface, the touch device 110 has a gradient, and when the touch device 110 is provided to have a curved surface, the touch device 110 has a curvature. Hereinafter, different modified embodiments are illustrated in FIGS. 6 and 7.

Figure 6:
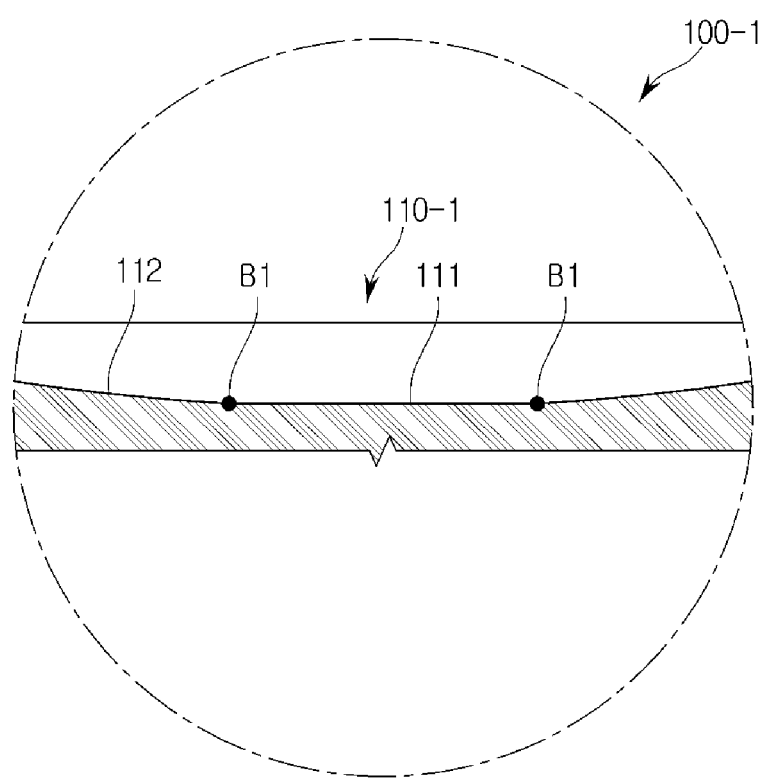
FIG. 6 is a cross-sectional view illustrating a first modified embodiment of the touch input device in accordance with the first embodiment of the present disclosure.
Figure 7:
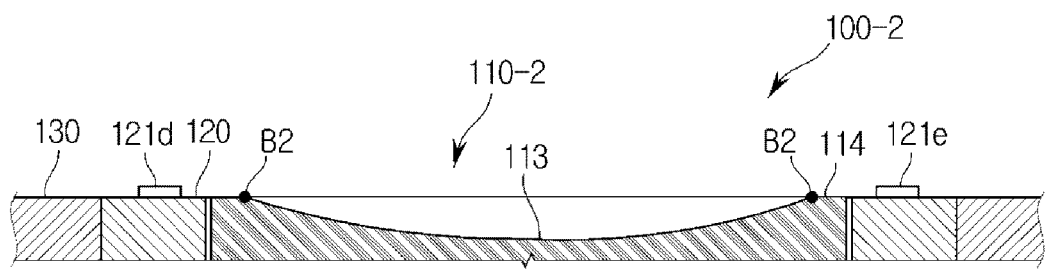
FIG. 7 is a cross-sectional view illustrating a second modified embodiment of the touch input device in accordance with the first embodiment of the present disclosure.

FIG. 6 is a cross-sectional view illustrating a first modified embodiment 100-1 of the touch input device in accordance with the first embodiment of the present disclosure.

As shown in FIG. 6, although not illustrated in the drawings, a touch device 110-1 in the first modified embodiment 100-1 may be provided to have a circular shape (see FIG. 2). A center portion 111 of the touch device 110-1 may be provided to have a flat surface and an outer portion 112 thereof may be provided to have a concave curved surface. In this case, a boundary B1 between the center portion 111 and the outer portion 112 may also be provided to have a circular shape.

As the touch device 110-1 is provided such that a ratio of a width of the center portion 111 to a width of the outer portion 112 is changed, different effects may be obtained. For example, when the width of the center portion 111 is relatively large and the width of the outer portion 112 is small, the center portion 111 having a flat surface may be used as a space into which a gesture such as a letter and the like is entered, and the outer portion 112 having a curved surface may be provided such that a circular shape gesture operation such as rolling, spinning or the like is easily entered.

On the other hand, when the width of the center portion 111 is relatively small and the width of the outer portion 112 is large, the outer portion 112 having a curved surface may be used as a space into which a gesture is entered, and the center portion 111 may be used as a mark by which the user can detect the center of the touch device 110-1.

Meanwhile, touch signals, which are input to the center portion 111 and the outer portion 112, may be distinguished from each other. For example, the touch signal input to the center portion 111 may refer to a signal on a submenu, and the touch signal input to the outer portion 112 may refer to a signal on a top menu.

FIG. 7 is a cross-sectional view illustrating a second modified embodiment 100-2 of the touch input device in accordance with the first embodiment of the present disclosure.

As shown in FIG. 7, a center portion 113 of a touch device 110-2 in the second modified embodiment 100-2 may be provided to have a concave curved surface, and the outer portion 114 thereof may be provided to have a flat surface. In this case, a boundary B2 between the center portion 113 and the outer portion 114 may be provided to have a circular shape.

Meanwhile, in addition to the modified embodiments illustrated in FIGS. 6 and 7, the center portions 111 and 113 and the outer portions 112 and 114 may be provided to have various shapes. Alternatively, the center portions 111 and 113 and the outer portions 112 and 114 may be separated into two or more sections.

Figure 8:
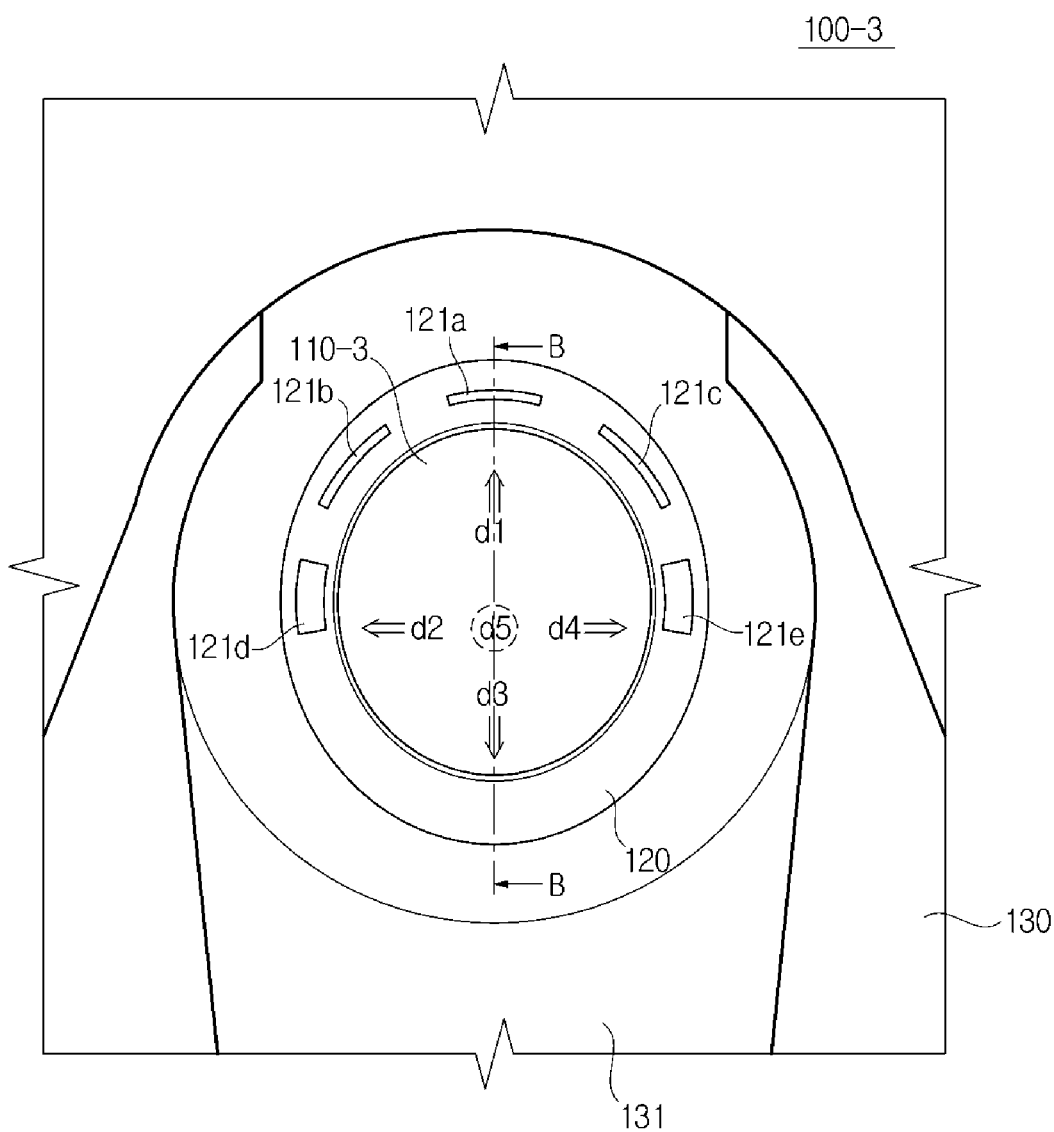
FIG. 8 is a top view illustrating a third modified embodiment of the touch input device in accordance with the first embodiment of the present disclosure.
Figure 9:
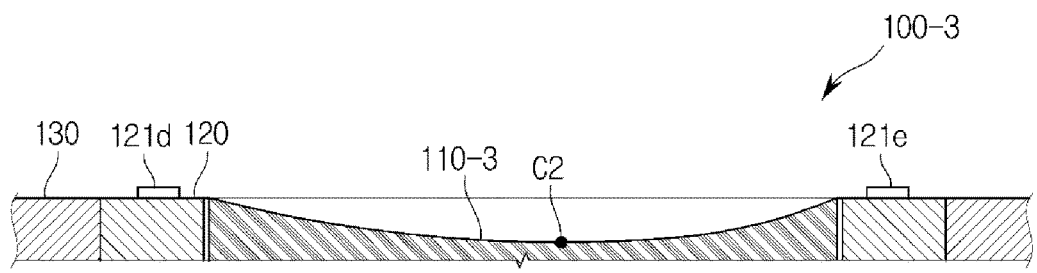
FIG. 9 is a cross-sectional view taken along line B-B of FIG. 8.

FIG. 8 is a plan, or top, view illustrating a third modified embodiment 100-3 of the touch input device in accordance with the first embodiment of the present disclosure, and FIG. 9 is a cross-sectional view taken along line B-B of FIG. 8.

As shown in FIGS. 8 and 9, a touch device 110-3 in accordance with the third modified embodiment 100-3 may be provided to have an elliptical shape. For example, as illustrated in FIG. 8, the touch device 110-3 may be provided such that an inner diameter thereof in a vertical direction is greater than an inner diameter thereof in a width direction.

Also, a lowermost point C2 of the touch device 110-3 may be biased in any direction from the center thereof. For example, as illustrated in FIG. 9, the lowermost point C2 may be biased in a downward direction.

Figure 10:
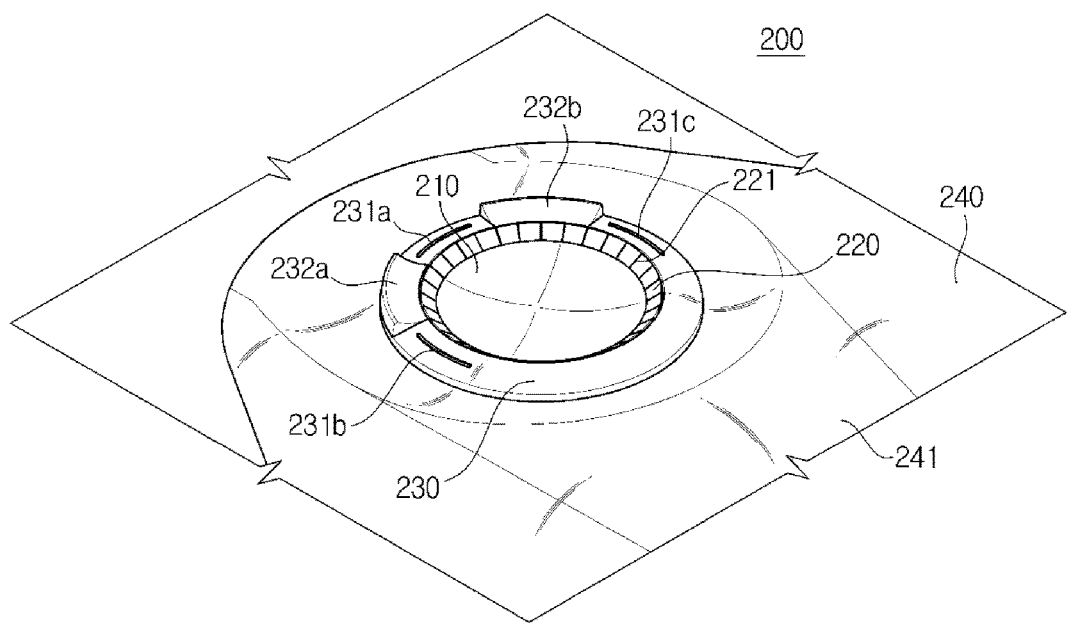
FIG. 10 is a perspective view illustrating a touch input device in accordance with a second embodiment of the present disclosure.

FIG. 10 is a perspective view illustrating a touch input device 200 in accordance with a second embodiment of the present disclosure.

As shown in FIG. 10, the touch input device 200 in accordance with the second embodiment of the present disclosure may include touch devices 210 and 220 in which the user enters gestures by touching, and a rim device 230 which surrounds the touch devices 210 and 220.

The touch devices 210 and 220 may include a gesture input device 210 located at a center portion and a swiping input 220 located along an edge of the gesture input device 210. Here, the swiping input 220 may refer to a portion provided such that a swiping gesture is entered, and the swipe may refer to entering the gesture in a state in which a pointer is not separated from a touchpad.

The touch devices 210 and 220 may be touchpads on which signals are entered when the user is in contact with or close to the touch devices 210 and 220 using a finger, or a pointer such as a touch pen or the like. The user may enter a desired instruction or command by entering a predetermined touch gesture on the touch devices 210 and 220.

The touchpad may include a touch film, a touch sheet, or the like including a touch sensor. Also, the touchpad may include a touch panel which is a display device of which a screen is touchable.

Meanwhile, the position of the pointer that is recognized in a state in which the pointer is close to the touchpad without being in contact with the touchpad refers to a "proximity touch," and the position of the pointer that is recognized when the pointer is in contact with the touchpad refers to a "contact touch." In this case, the position recognized in the proximity touch may be a position at which the pointer vertically corresponds to the touchpad when the pointer is close to the touchpad.

The touchpad may be provided using a resistive film method, an optical method, a capacitance method, an ultrasonic method, a pressure method and the like. That is, the touchpads may be provided using various known methods.

The rim device 230 may refer to a portion which surrounds the peripheries of the touch devices 210 and 220 and may be provided as a member different from the touch devices 210 and 220. Key buttons 232a and 232b or touch buttons 231a, 231b, and 231c, which surround the touch devices 210 and 220, may be disposed on the rim device 230. That is, the user may enter a gesture on the touch devices 210 and 220, and may input a signal using the buttons 231 (231a, 231b, and 231c) and 232 (232a and 232b) provided on the rim device 230 on the peripheries of the touch devices 210 and 220.

The touch input device 200 may further include a wrist support device 241 located under the touch devices 210 and 220 to support the wrist of the user. In this case, the wrist support device 241 may be disposed higher than touch surfaces of the touch devices 210 and 220. When the user enters a gesture in the touch devices 210 and 220 using his or her finger while supporting the wrist on the wrist support device 241, the wrist may be prevented from being bent. Therefore, musculoskeletal disorders of the user may be prevented, and a more comfortable sense of operation may be provided.

Figure 11:
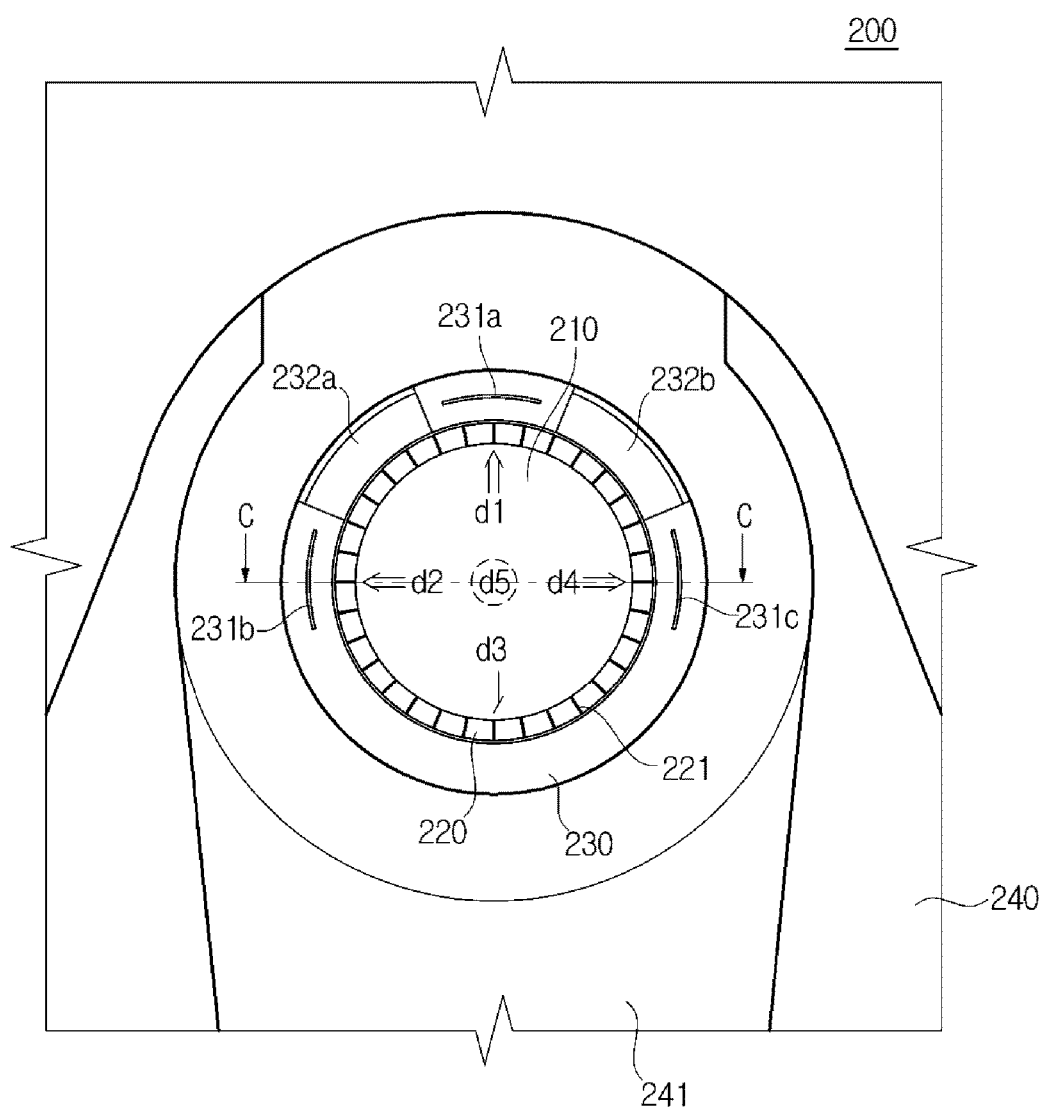
FIG. 11 is a top view illustrating the touch input device in accordance with the second embodiment of the present disclosure.
Figure 12:
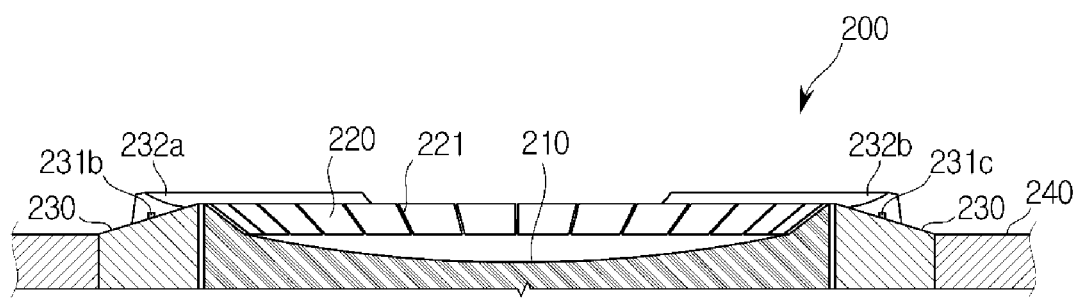
FIG. 12 is a cross-sectional view taken along line C-C of FIG. 11.

FIG. 11 is a plan, or top, view illustrating the touch input device 200 in accordance with the second embodiment of the present disclosure, and FIG. 12 is a cross-sectional view taken along line C-C of FIG. 11.

As shown in FIGS. 11 and 12, the touch devices 210 and 220 may include a portion lower than a boundary with the rim device 230. That is, touch surfaces of the touch devices 210 and 220 may be disposed lower than the rim device 230. For example, the touch devices 210 and 220 may be provided to be inclined downward from the boundary with the rim device 230, or may be stepped at the boundary with the rim device 230.

Also, as the touch devices 210 and 220 may be located lower than the boundary with the rim device 230, the user may recognize regions and/or a boundary of the touch devices 210 and 220 by the sense of touch. A recognition rate of the gesture may be increased when the gesture is entered in center regions of the touch devices 210 and 220. Also, even though similar gestures are entered, when the gestures are entered at different positions of the touch devices 210 and 220, there is a risk in that the controller recognizes the gestures as different commands. The problem is that the user enters the gesture while the user is not focusing his or her eyes on the touch region. In the case in which the user enters the gesture while watching the display device, or in the case in which the user enters the gesture in a state of focusing on external circumstances, when the user can intuitively recognize the touch region and the boundary by the sense of touch, it may be advantageous in that the user enters the gesture at an accurate position. Therefore, the input accuracy of the gesture is improved.

The touch devices 210 and 220 may include the gesture input device 210 located at the center thereof and the swiping input 220 provided to be inclined downward along the edge of the gesture input device 210. When the touch devices 210 and 220 are provided to have a circular shape, the gesture input device 210 may be provided to have a shape of an inner portion of a spherical surface, and the swiping input 220 may be provided to have an inclined surface which surrounds a circumference of the gesture input device 210.

The user may enter a swiping gesture along the swiping input 220 having the circular shape. For example, the user may enter the swiping gesture along the swiping input 220 in a clockwise direction or in a counterclockwise direction. Meanwhile, although the circular shape gesture operation such as rolling, spinning, or the like in the gesture input device 210 or the gesture operation rubbing from left to right is included in the swiping gestures, the swiping gestures in the embodiments of the present disclosure refer to gestures entered in the swiping input 220.

The swiping gesture entered in the swiping input 220 may be entered as a different gesture when an input start point or end point is changed. That is, the swiping gesture entered in the swiping input 220 located at the left side of the gesture input device 210 and the swiping gesture entered in the swiping input 220 located at the right side of the gesture input device 210 may cause different operations. Also, even in the case in which the user enters the swiping gesture by being in contact using the finger at the same point, when the end point of the gesture, that is, a position at which the finger of the user is separated, is changed, the gestures may be recognized as different gestures.

Also, a tapping gesture may be input on the swiping input 220. That is, different commands or instructions may be entered according to a position of the swiping input 220 at which the user taps.

The swiping input 220 may include a plurality of gradations 221. The gradations 221 may visually or tactually inform the user of a relative position. For example, the gradations 221 may be formed in an intaglio method or an embossed method. The gradations 221 may be disposed at regular intervals. Therefore, the user may intuitively know the number of the gradations 221 which the finger passes during the swiping operation, and thus a length of the swiping gesture may be precisely adjusted.

For example, in the swiping gesture, a cursor displayed on the display device may be moved according to the number of the gradations 221 which the finger passes. When various selectable letters are consecutively disposed on the display device, the user may move from one selected letter to the next when the user passes one gradation 221 while performing the swiping operation by moving one notch forward.

The swiping input 220 in accordance with the embodiment of the present disclosure may be provided so that its gradient is greater than a tangential gradient of the gesture input device 210 at a boundary between the swiping input 220 and the gesture input device 210. When the user enters a gesture in the gesture input device 210, the user may intuitively recognize the touch region of the gesture input device 210 by a difference between the slopes of the swiping input 220 and the gesture input device 210.

Meanwhile, while the gesture is entered in the gesture input device 210, the touching of the swiping input 220 may not be recognized. Therefore, even involving a region of the swiping input 220 while the user enters the gesture in the gesture input device 210, the entering of the gesture in the gesture input device 210 may not overlap the entering of the gesture in the swiping input 220.

Meanwhile, the gesture input device 210 and the swiping input 220 may be integrally formed. Touch sensors may be respectively provided in the gesture input device 210 and the swiping input 220, or one touch sensor may be provided in the gesture input device 210 and the swiping input 220. When one touch sensor is provided in the gesture input device 210 and the swiping input 220, as the controller distinguishes the touch region of the gesture input device 210 from the touch region of the swiping input 220, a gesture input signal of the gesture input device 210 may be distinguished from a gesture input signal of the swiping input 220.

The touch input device 200 may further include button inputs 231 and 232. The button inputs 231 and 232 may be located on the peripheries of the touch devices 210 and 220. The user may manipulate the buttons 231 and 232 without changing of the position of the hand while entering the gesture, and thus may rapidly issue operation commands.

The button inputs 231 and 232 may include touch buttons 231a, 231b, and 231c which can perform predetermined functions by the touching of the user, or pressing buttons 232a and 232b which can perform predetermined functions while positions thereof are changed by the external force applied by the user. When the touch buttons 231a, 231b, and 231c are used, touch sensors may also be included in the button inputs 231 and 232.

The pressing buttons 232a and 232b may be provided to be slidable and moved in a vertical direction (an out-of-plane direction) by the external force, or in an in-plane direction. In the latter case, the user may input a signal while pulling or pushing the pressing buttons 232a and 232b. Also, when the pressing buttons 232a and 232b are pushed or pulled, the pressing buttons 232a and 232b may operate so that different signals are input.

In the drawings, five buttons 231 and 232 are illustrated. For example, each of the buttons 231 and 232 may include a home button 231a for moving to a home menu, a back button 231b for moving from a current screen to a previous screen, an option button 231c for moving to an option menu, and two shortcut buttons 232a and 232b. The shortcut buttons 232a and 232b may be buttons for moving directly to menus frequently used by the user or to designated devices.

In the button inputs 231 and 232 in accordance with the embodiment of the present disclosure, the touch buttons 231a, 231b, and 231c are located at an upper portion and both sides thereof, and the pressing buttons 232a and 232b are located between the touch buttons 231a, 231b and 231c. As the pressing buttons 232a and 232b are located between the adjacent touch buttons 231a, 231b and 231c, a mistaken touch of the touch buttons 231a, 231b, and 231c which causes an operation different from the intent of the user may be prevented.

Figure 13:
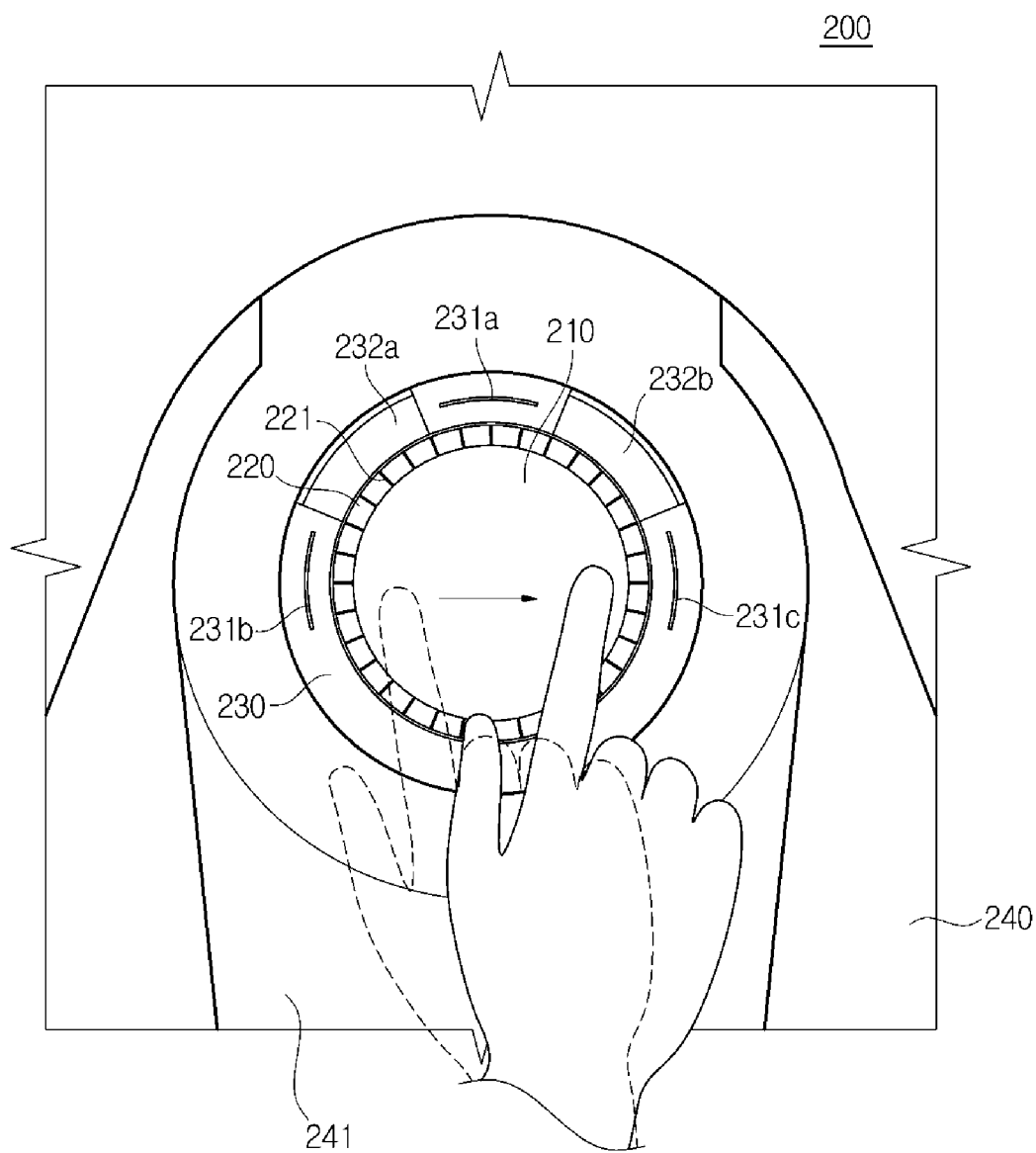
FIGS. 13 to 15 are views for describing the manipulation of a touch input device in accordance with the second embodiment of the present disclosure, where
Figure 14:
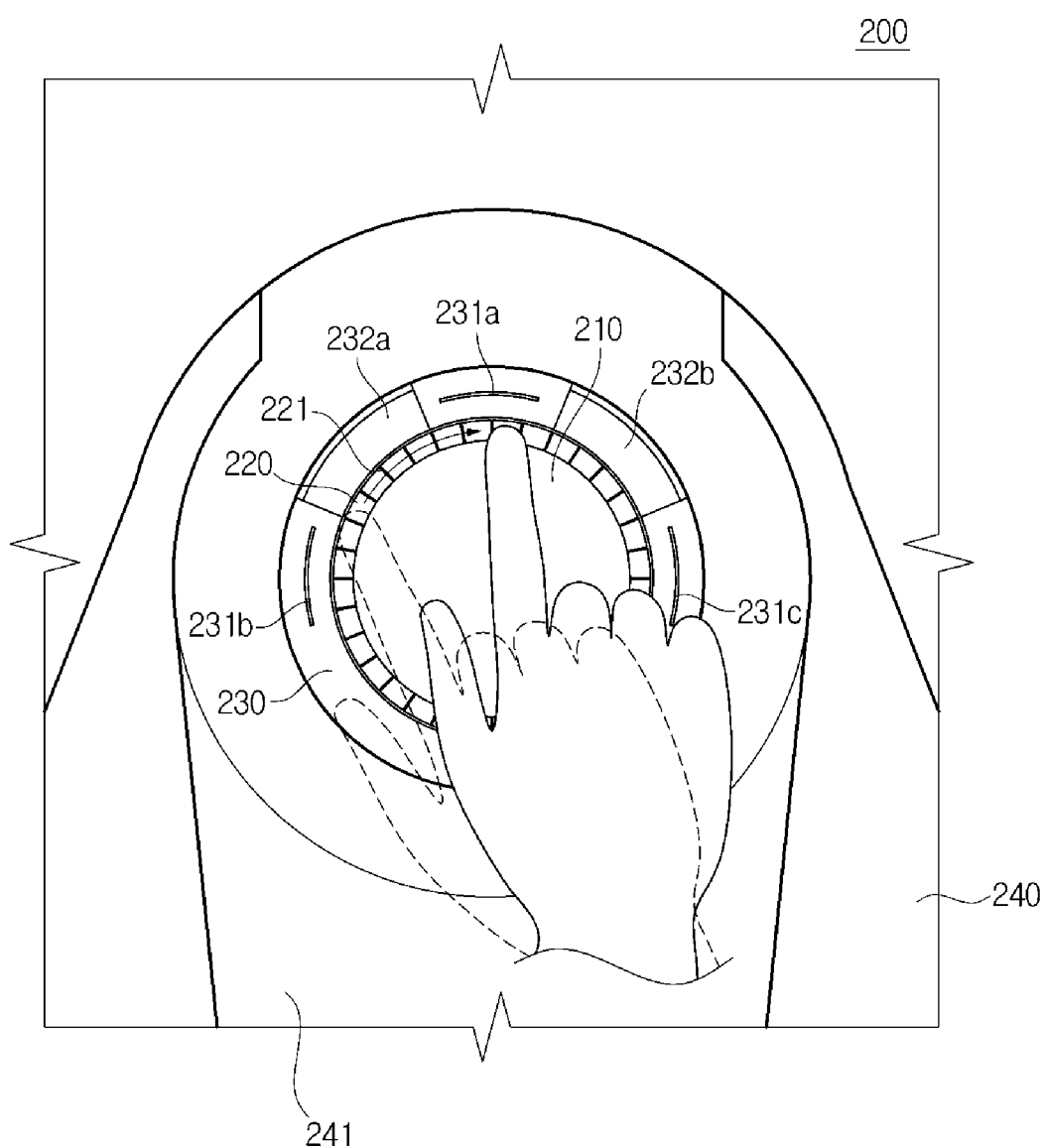
Figure 15:
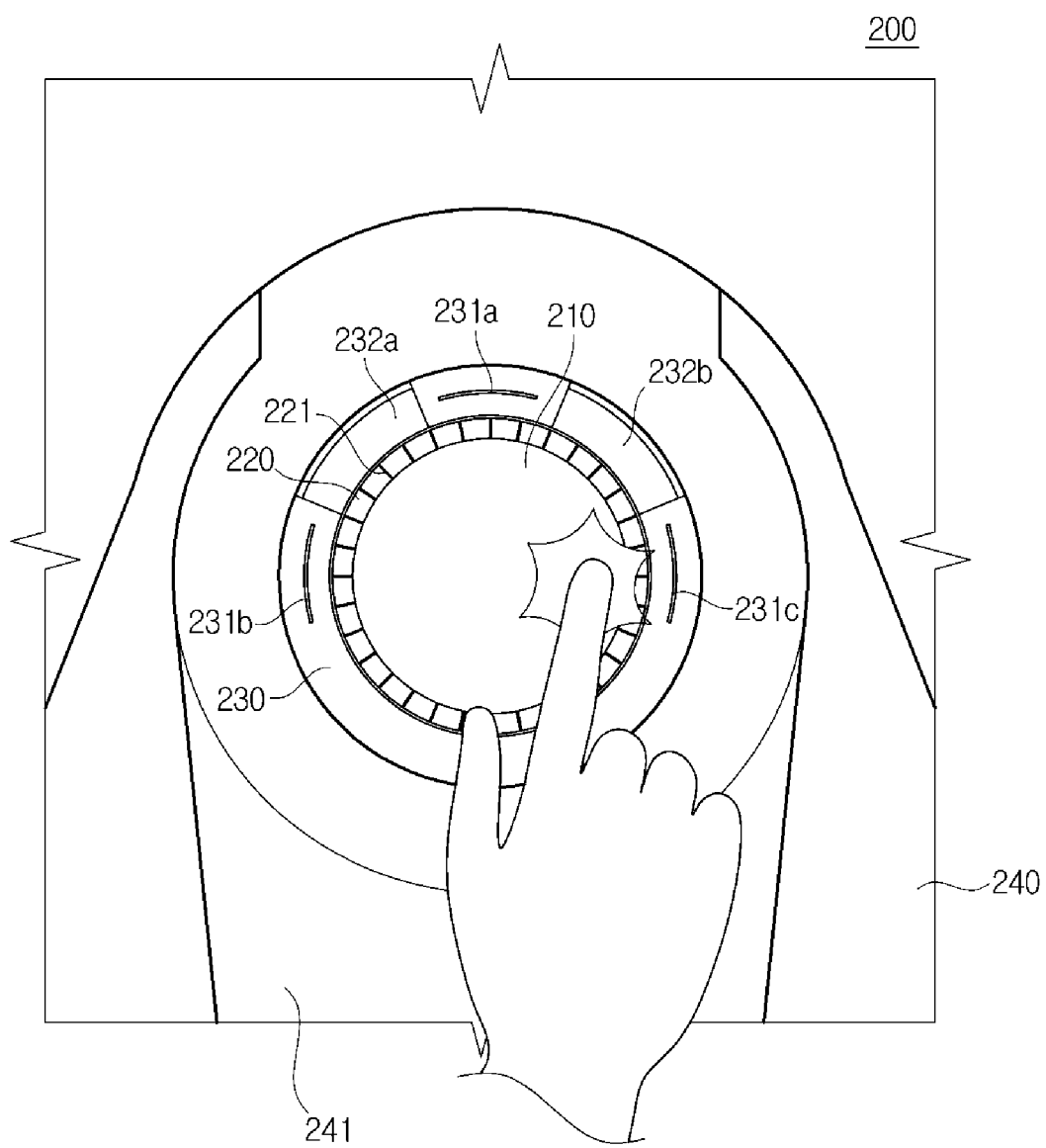

FIGS. 13 to 15 are views for describing the manipulation of the touch input device 200 in accordance with the second embodiment of the present disclosure. FIG. 13 is a plan, or top, view illustrating a gesture input state, FIG. 14 is a plan, or top, view illustrating a swiping input state, and FIG. 15 is a plan, or top, view illustrating a pressing input state.

Referring to FIG. 13, the user may input an operation command by drawing a gesture on the gesture input device 210. FIG. 13 illustrates a flicking gesture in which a pointer is moved from left to right. Referring to FIG. 14, the user may input an operation command by rubbing the swiping input 220. FIG. 14 illustrates a swiping gesture in which a pointer is initially in contact with the swiping input 220 at a left side and moved to an upper portion thereof along the swiping input 220. Referring to FIG. 15, the user may input an operation command by pressing the gesture input device 210. FIG. 15 illustrates an operation in which a right side of the gesture input device 210 is pressed.

Figure 16:
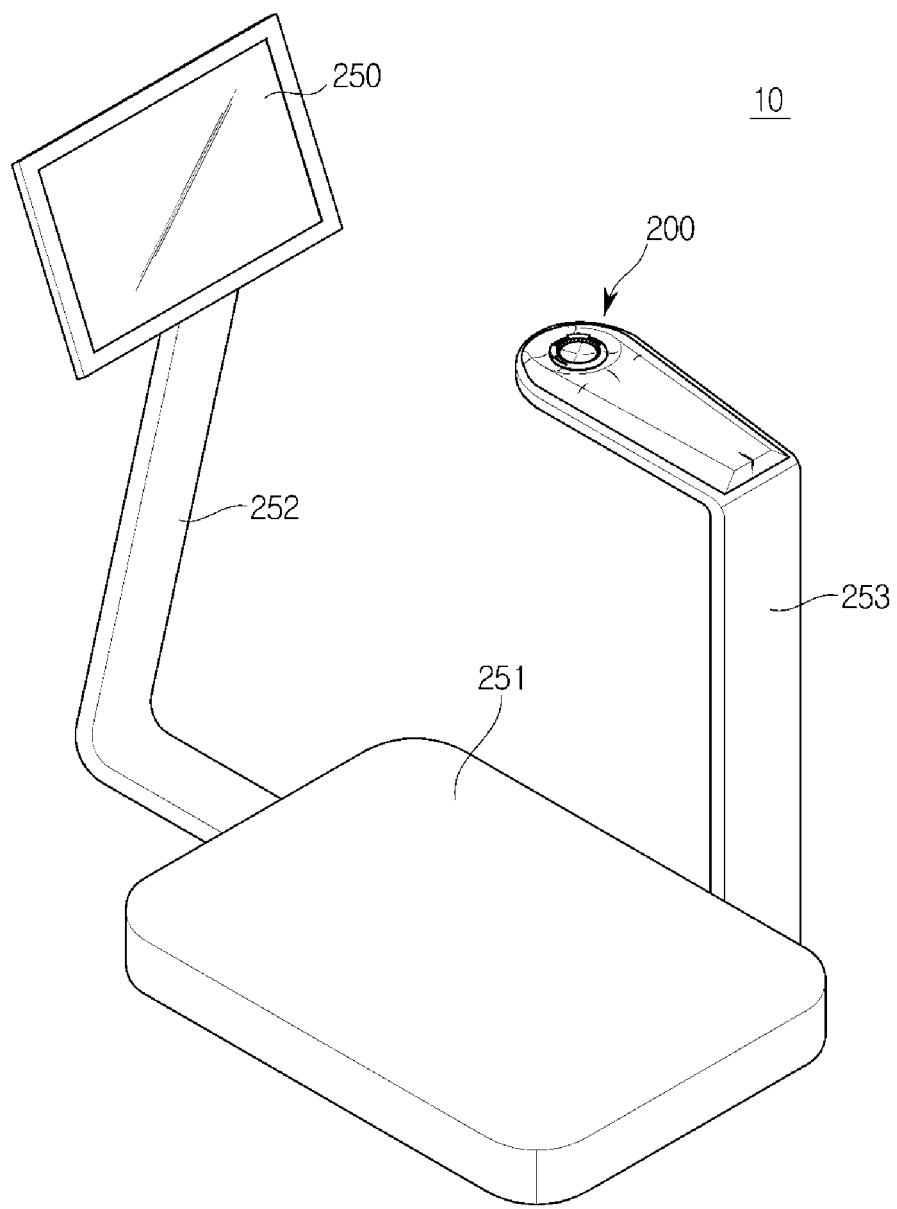
FIG. 16 is a perspective view illustrating a health device in which a touch input device in accordance with the second embodiment of the present disclosure is installed.

FIG. 16 is a perspective view illustrating a health device 10 in which the touch input device 200 in accordance with the second embodiment of the present disclosure is installed.

As shown in FIG. 16, the touch input device 200 in accordance with the embodiment of the present disclosure may be installed in the health device 10. Here, the health device 10 may include a medical device. The health device 10 may include a main body device 251 on which the user stands, a display device 250, a first connection part 252 which connects the main body device 251 to the display device 250, the touch input device 200, and a second connection part 253 which connects the touch input device 200 to the main body device 251.

The main body device 251 may measure various pieces of information regarding a human body including the weight of the user. Also, the display device 250 may display various pieces of information on images including the measured information on the human body and the like. Also, the user may manipulate the touch input device 200 while watching the display device 250.

The touch input device 200 in accordance with the embodiment of the present disclosure may be installed in a vehicle 20.

Here, the vehicle 20 refers to one of various devices which move a transported physical object such as a human, a thing, an animal, or the like from a starting point to a destination. The vehicle 20 may include a car traveling on roads or tracks, a ship which moves on seas or rivers, an airplane which flies in the sky and the like.

Also, the car traveling on roads or tracks may move in a predetermined direction according to the rotation of at least one wheel, and may include, for example, a three-wheeled or four-wheeled car, construction machinery, a two-wheeled vehicle, a motorcycle, a bicycle and a train which runs on tracks.

Figure 17:
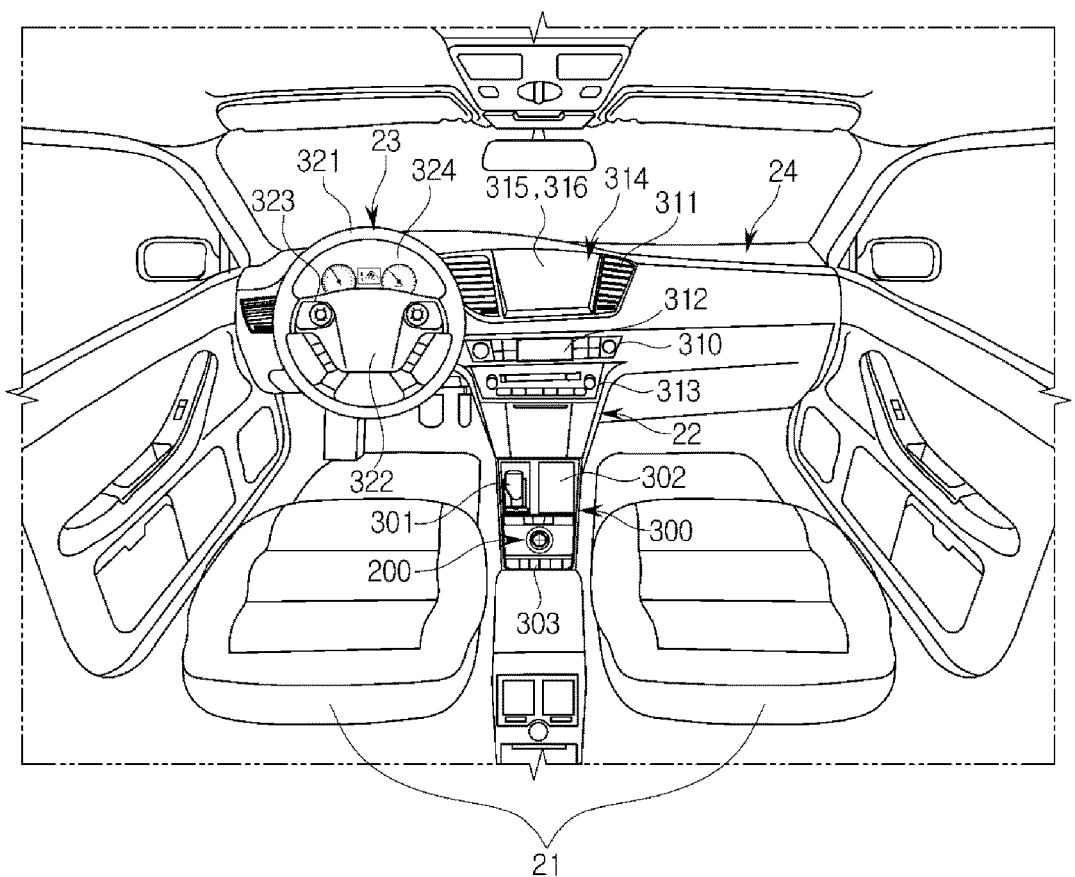
FIG. 17 is a view illustrating an interior of a vehicle in which a touch input device in accordance with the second embodiment of the present disclosure is installed.
Figure 18:
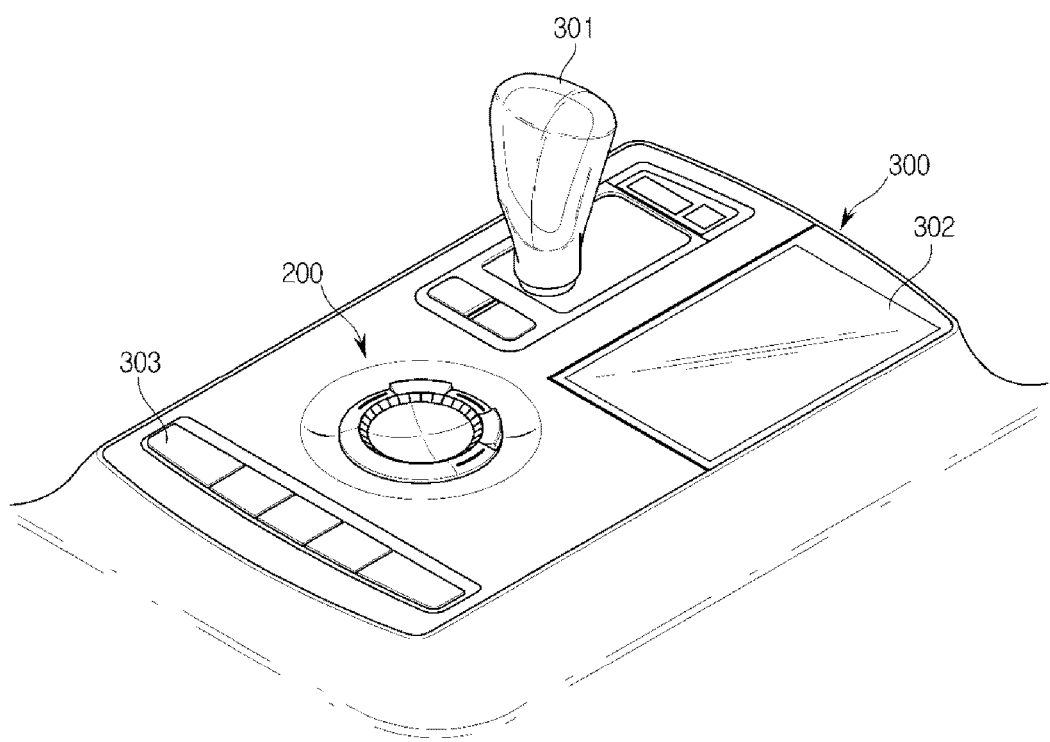
FIG. 18 is a perspective view illustrating a gearbox in which a touch input device in accordance with the second embodiment of the present disclosure is installed.

FIG. 17 is a view illustrating an interior of the vehicle 20 in which the touch input device 200 in accordance with the second embodiment of the present disclosure is installed, and FIG. 18 is a perspective view illustrating a gearbox, or gearbox controller, 300 in which the touch input device 200 in accordance with the second embodiment of the present disclosure is installed.

Referring to FIG. 17, the vehicle 20 may include seats 21 on which a driver and the like sit, the gearbox 300, a center fascia 22 and a dashboard 24 in which a steering wheel 23 and the like are provided.

An air conditioner 310, a clock 312, an audio device 313, an audio video navigation (AVN) device 314 and the like may be installed in the center fascia 22.

The air conditioner 310 maintains a comfortable inside of the vehicle 20 by adjusting the temperature, humidity, cleanliness of the air and flow of the air inside of the vehicle 20. The air conditioner 310 may be installed in the center fascia 22, and may include at least one discharging port 311 which discharges the air. Buttons or dials for controlling the air conditioner 310 may be installed in the center fascia 22. The user such as the driver and the like may control the air conditioner 310 using the buttons installed in the center fascia 22.

The clock 312 may be provided adjacent to the buttons or dials for controlling the air conditioner 310.

The audio device 313 includes a control panel including a plurality of buttons for performing functions of the audio device 313. The audio device 313 may provide a radio mode in which a radio function is provided, and a media mode in which an audio file stored in various storage media is played back.

The AVN device 314 may be embedded into the center fascia 22 of the vehicle 20 or may be formed to protrude from the dashboard 24. The AVN device 314 is a device in which an audio function, a video function, and a navigation function can be integrally performed by the manipulation of the user. The AVN device 314 may include an input 315 which receives user commands with respect to the AVN device 314, and a display device 316 which displays a screen related to the audio function, a screen related to the video function, or a screen related to the navigation function. Meanwhile, the audio device 313 may be omitted when its range of functionality overlaps the AVN device 314.

The steering wheel 23, which is a device for controlling a driving direction of the vehicle 20, may include a rim 321 for gripping by the driver, and a spoke 322 which is connected to a steering system of the vehicle 20 and connects a hub of a rotary shaft for steering to the rim 321. In some embodiments, a manipulation device 323 for controlling various devices installed in the vehicle 20, for example, the audio device and the like may be installed in the spoke 322.

Also the dashboard 24 may further include an instrument panel 324 which informs the driver of various pieces of information on the vehicle such as a vehicle velocity, a distance traveled, the rotational speed of the engine, an amount of lubrication, a coolant temperature, various warnings, or the like while driving the vehicle, a glove box 325 that can store various goods and the like.

In general, the gearbox 300 may be installed between the driver's seat and a passenger's seat inside of the vehicle 20, and manipulation devices that are manipulated by the driver while driving the vehicle 20 may be mounted in the gearbox 300.

Referring to FIG. 18, a shift lever 301 for changing the velocity of the vehicle 20, a display device 302 for controlling the function performance of the vehicle 20, and buttons 303 for operating various components of the vehicle 20 may be installed in the gearbox 300. Also, the touch input device 200 in accordance with the second embodiment of the present disclosure may be installed.

The touch input device 200 in accordance with the embodiment of the present disclosure may be installed in the gearbox 300 and located so as to be manipulated by the driver in a state in which the driver watches the front side while driving. For example, the touch input device 200 may be disposed under the shift lever 301. Meanwhile, the touch input device 200 may be installed in the center fascia 22, or in the passenger's seat or the back seats.

The touch input device 200 may be connected to the display devices installed in the vehicle 20 to select, or perform functions associated with, various icons displayed on the display devices. The display device installed in the vehicle 20 may include the audio device 313, the AVN device 314, or the instrument panel 324. Also, the display device 302 may be installed in the gearbox 300 as required. Also the display device may be connected to a head up display (HUD) device, a rear view mirror or the like.

For example, the touch input device 200 may move a cursor displayed on the display device, or perform functions corresponding to icons. The icons may include a main menu, a selection menu, a setting menu and the like. Also, the navigation may be run, driving conditions of the vehicle may be set, and peripheral devices of the vehicle may be run through the touch input device 200.

Next, a structure of a touch input device 400 will be described with reference to FIG. 19.

Figure 19:
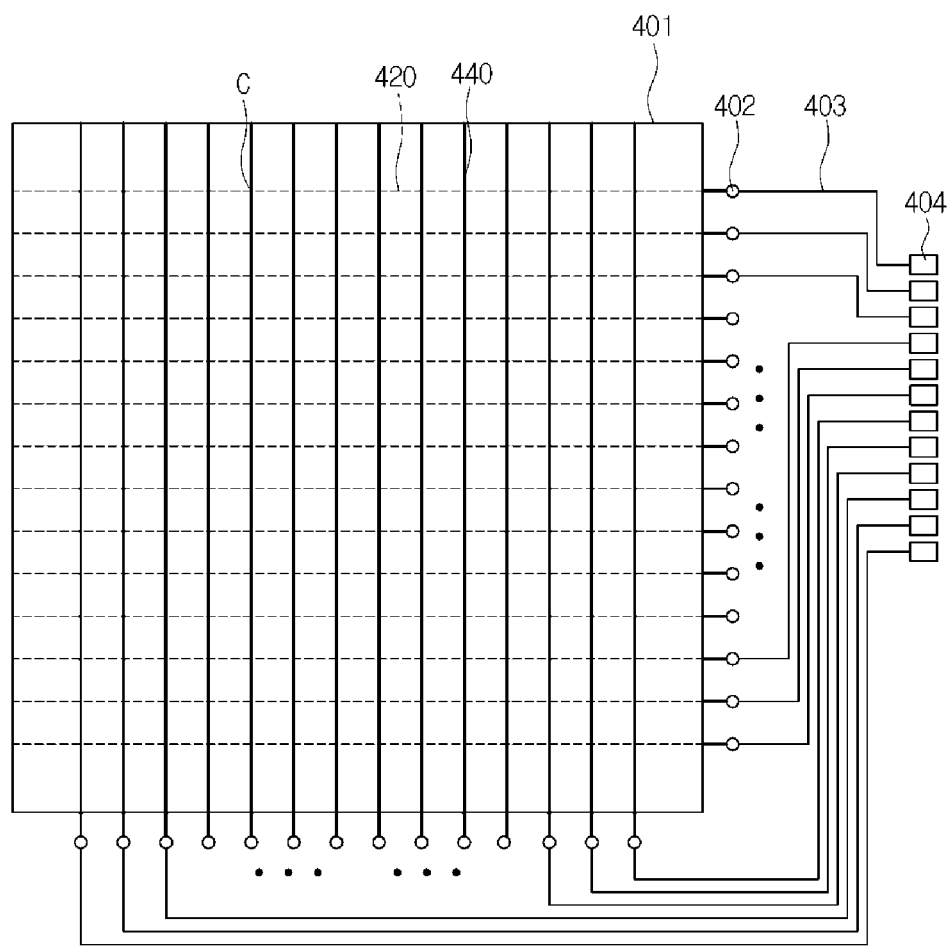
FIG. 19 is a view illustrating an arrangement of electrodes of a touch input device in accordance with the second embodiment of the present disclosure.

As shown in FIG. 19 is a view illustrating an arrangement of electrodes of the touch input device 400 in accordance with the second embodiment of the present disclosure. Although FIG. 19 is different from an actual structure, FIG. 19 is a plan, or top, view clearly illustrating a method of operating the touch input device 400. The touch input device 400 includes a touch device 401 that can be in contact with an input means (e.g., a finger or a touch pen) of the user, sense patterns 420 and 440, which are integrally formed with the touch device 401 or provided under the touch device 401, and wires 403 and connection pads 404 which are connected to the sense patterns 420 and 440.

The sense patterns (420, 440) may include a first sense pattern 420 and a second sense pattern 440. The first sense pattern may be a transmission (Tx) electrode, and the second sense pattern may be a reception (Rx) electrode.

The first sense patterns 420 and the second sense patterns 440 may be formed as predetermined patterns for detecting a change of capacitance when the user is in contact with the touch input device 400 using the finger, the touch pen, or the like to detect the position thereof. Here, the contacting (touching) may be defined as including both direct contacting and indirect contacting. That is, the direct contacting represents the case in which an object is in contact with the touch input device 400, and the indirect contacting represents a state in which the object is not in contact with the touch input device 400 but approaches the touch input device 400 in a range in which the sense patterns can detect the object.

All of a mutual capacitance method, a ground capacitance method, and a self-capacitance method may be used in the touch input device 400. The ground capacitance method detects a change in capacitance by using a single electrode for each basic pixel. The self-capacitance method may be used when multi-touching is not required. The mutual capacitance method detects a change in capacitance formed at an intersection of sense patterns provided in a lattice electrode structure. Therefore, when the mutual capacitance method is used, the multi-touching is possible.

The first sense patterns 420 may be arranged by dividing into predetermined segments in a first direction (a horizontal direction in the drawing), and the second sense pattern 440 may be arranged by dividing into predetermined segments in a second direction (a vertical direction in the drawing) different from the first direction. The first sense patterns 420 and the second sense patterns 440 may be provided on different layers from each other, and may form crossing portions C. In the crossing portions C, the first sense patterns 420 and the second sense patterns 440 may not be directly in contact with each other and may overlap each other with insulation portions therebetween.

The crossing portions C may determine the resolution of the touch device 401, and may be recognized as coordinates. That is, the case in which the input means is in contact with any one of the crossing portions C and the case in which the input means is in contact with the crossing portion C adjacent thereto may be distinguished, and a position of the crossing portion C with which the input means is in contact may be determined. Therefore, as the number of the crossing portions C formed in the same area is increased, the resolution of the touch device 401 is increased.

An end of each of the first and second sense patterns 420 and 440 may be connected to the wires 403 made of a metal wiring. The connection pad 404 may be provided at an end of the wire 403, and each of the wires 403 may be connected to a circuit board (not illustrated) through the connection pad 404.

Also, connection parts 402 may be respectively provided at end portions of the first and second sense patterns 420 and 440. Since the connection part 402 is provided to have a width greater than widths of the first and second sense patterns 420 and 440, it is easy to electrically connect the wire 403 thereto. The connection part 402 and the wire 403 may be bonded by a conductive adhesive (e.g., a solder).

The wire 403 may transmit a detection signal of the sense pattern to the circuit board through the connection pad 404. Each of the wires 403 and the connection pads 404 may be formed of a conductive material.

When the input means is in contact with a region of the touch device 401, the capacitance of the crossing portions C is reduced, and information on the capacitance is transmitted to the controller through the wires 403 and the connection pads 404, and the controller may determine a position with which the input means is in contact. Also, when the input means is close to the region of the touch device 401, it may be configured that the capacitance is reduced. In this case, the controller may determine a position to which the input means is close.

Figure 20:
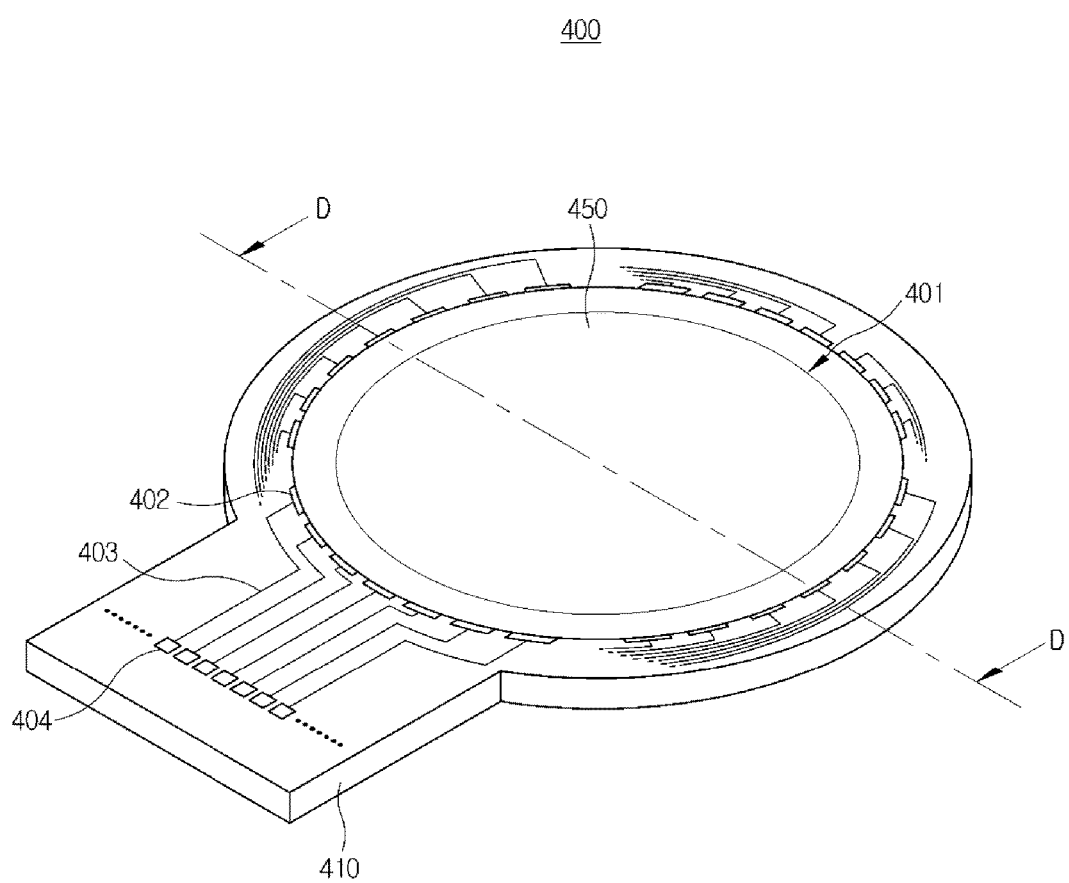
FIG. 20 is a perspective view illustrating an internal configuration of a touch input device in accordance with the second embodiment of the present disclosure.
Figure 21:
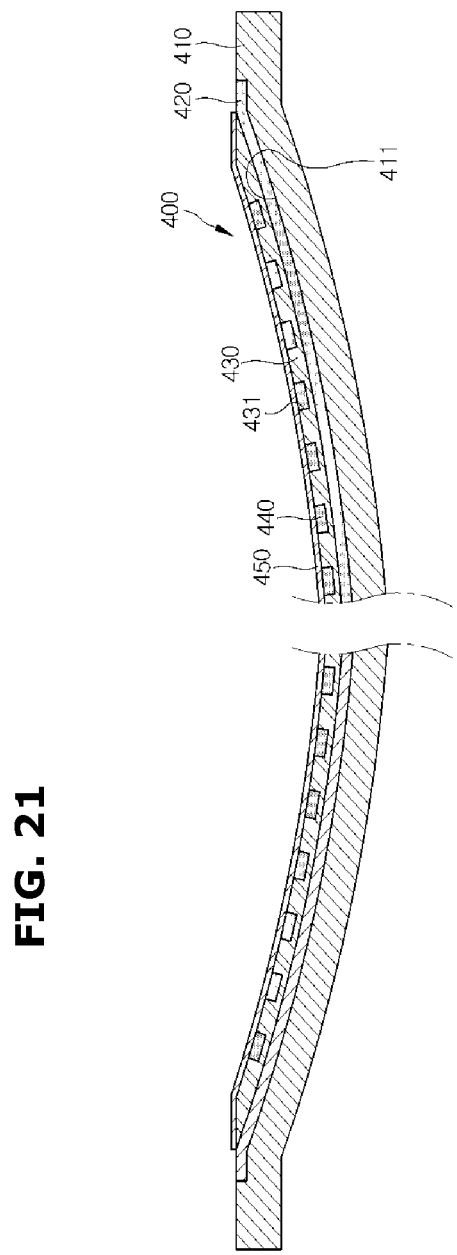
FIG. 21 is a cross-sectional view taken along line D-D of FIG. 20.

FIG. 20 is a perspective view illustrating an internal configuration of a touch input device 400 in accordance with the second embodiment of the present disclosure, and FIG. 21 is a cross-sectional view taken along line D-D of FIG. 20.

As shown in FIGS. 20 and 21, the touch input device 400 may include a first base 410 including a first pattern groove 411, first sense patterns 420 plated or deposited (or evaporated) in the first pattern groove 411, a second base 430 stacked on the first base 410 and including second pattern grooves 431, second sense patterns 440 plated or deposited in the second pattern grooves 431 and a coating layer 450 which insulates the second sense patterns 440 from others.

The first sense patterns 420 and the second sense patterns 440 may be respectively formed on the first base 410 and the second base 430 using a laser directing structure (LDS) method. Here, the LDS method refers to a method in which a support member is formed of a material including a conductive and chemically stable metal composite, a portion of the support member is exposed by a laser such as a ultraviolet (UV) laser or an excimer laser, a metal seed is exposed by breaking the chemical bonding of the metal composite, and then a conductive structure is formed on the portion of the support member exposed by the laser by metalizing the support member. The LDS method is disclosed in Korean Patent No. 374667, Korean Patent Application Publication No. 2001-40872, and Korean Patent Application Publication No. 2004-21614, and this specification will refer to these documents, which are incorporated herein in their entireties by reference.

The first and second sense patterns 420 and 440 may be provided with a conductive material, for example, a metal. In consideration of conductivity and economic efficiency, copper (Cu) among metals may be used. However, the first and second sense patterns 420 and 440 may be formed of a metal such as gold (Au) or the like, other than copper (Cu).

Also, a plating process and a deposition (or evaporation) process, which are used as methods of forming the first sense patterns 420 and the second sense patterns 440, may use a technique that is widely used in the art.

In a broad sense, the plating process may be a process in which a thin metal layer is coated on a surface of a subject. In this case, the plating may be a concept including deposition. Also, in a narrow sense, the plating process may be a process in which a metal in an ion state is selectively adhered to a metal seed present on a surface on which patterns are formed. The deposition process may be a process in which a metal in a plasma state in a high-temperature vacuum is adhered to a surface on which patterns are formed. In this case, in order for the metal to be selectively adhered to only the patterns in the deposition process, a masking process may be used. Also, in the present disclosure, the plating process may include a sputtering process in a form in which the plating process and the deposition process are combined.

Meanwhile, the first sense patterns 420 and the second sense patterns 440 may be formed through a three-dimensional (3D) electrode patterning process. For example, electrodes may be coated while nozzles are moved along coordinate values of the first sense patterns 420 and the second sense patterns 440.

The first sense patterns 420 may extend in the first direction (the horizontal direction in the drawing), and the patterns may be disposed in rows. Also, the second sense patterns 440 may extend in the second direction (the vertical direction in the drawing) perpendicular to the first direction, and the patterns may be disposed in columns. However, an angle of intersection between the first sense pattern 420 and the second sense pattern 440 is not limited to a right angle.

The first sense patterns 420 and the second sense patterns 440 may include a shape in which diamond-shaped patterns are continuously connected. However, the shapes of the patterns are not limited to the diamond shape, but various shapes may be applied thereto as required. The adjacent rhombus-shaped patterns may be connected by a connection part, and the connection part may be provided to have a type of a bridge which connects two patterns.

Each of the first base 410 and the second base 430 may include a metal composite. For example, the first base 410 and the second base 430 may be a composite containing a resin and a metal oxide. Here, the resin may contain at least one of polycarbonate (PC), polyamide (PA) and an acrylonitrile-butadiene-styrene (ABS) copolymer, and the metal oxide may contain at least one of Mg, Cr, Cu, Ba, Fe, Ti and Al.

The first pattern groove 411 which accommodates the first sense patterns 420 may be formed in a surface of the first base 410, and the second pattern groove 431 which accommodates the second sense patterns 440 may be formed in a surface of the second base 430. That is, the first and second sense patterns 420 and 440 may be respectively provided in the first and second pattern grooves 411 and 431.

The first and second pattern grooves 411 and 431 may be respectively formed by irradiating the surfaces of the first and second bases 410 and 430 with a laser. In this case, the first and second bases 410 and 430 are reduced to metals by heat generated while the grooves are formed, and the portions reduced to the metals form metal seeds in the first and second pattern grooves 411 and 431.

The formation of the first and second sense patterns 420 and 440 on the first and second pattern grooves 411 and 431 through the plating or deposition process has been described above.

The first and second sense patterns 420 and 440 may be prevented from oxidation by plating with copper (Cu) and plating with nickel (Ni) on the copper (Cu) plating. Also, when gold (Au) rather than nickel (Ni) is used, conductivity may be improved.

Meanwhile, the first and second bases 410 and 430 may be formed by injecting a metal composite, or may be formed by injecting other materials (e.g., a plastic, glass or the like) and coating with the metal composite thereon.

Meanwhile, the formation of the first and second pattern grooves 411 and 431 on the first and second bases 410 and 430 may include injecting using a mold in addition to engraving by a laser. That is, grooves may be formed on injection surfaces of the first and second pattern grooves 411 and 431 using molds having embossed shapes symmetrical to intaglio shapes of the first and second pattern grooves 411 and 431.

Meanwhile, in the touch input device 400 in accordance with the second embodiment of the present disclosure, the touch device 401 may be provided to have a curved surface. Also, the first and second sense patterns 420 and 440 may be provided to be curved according to a curvature of the touch surface.

The curved surface of the touch device 401 may include a curved surface having a constant curvature and a curved surface of which a curvature is changed. Alternatively, the curved surface of the touch device 401 may include a curved surface having two curvatures or more and a curved surface in which a curved direction is changed according to coordinates. Also, the touch device 401 may be provided to have an angled surface.

The surface of the first base 410 includes a curved surface. For example, the surface of the first base 410 may include a shape of a portion of a spherical surface. The first pattern groove 411 may be formed in the curved surface of the first base 410. In this case, since the first pattern groove 411 may be formed using a laser, the first pattern groove 411 having a complicated shape may be formed regardless of the shape of the first base 410.

Then, the first sense patterns 420 are plated or deposited in the first pattern groove 411. In this case, due to characteristics of the plating or deposition process, the first sense patterns 420 may be plated or deposited regardless of the shape of the first pattern groove 411, and the first sense patterns 420 are easily plated or deposited even when the first pattern groove 411 is provided in a straight line or a plane.

The second base 430 may be provided on the first base 410 with a constant thickness. Therefore, a curved surface having a curvature corresponding to the curvature of the first base 410 may be formed as the surface of the second base 430. The second pattern groove 431 may be formed on the curved surface of the second base 430. In this case, since the second pattern groove 431 is formed using a laser, the second pattern groove 431 having a complicated shape may be formed regardless of the shape of the second base 430.

Then, the second sense patterns 440 are plated or deposited in the second pattern groove 431. In this case, due to characteristics of the plating or deposition process, the second sense patterns 440 may be plated or deposited regardless of the shape of the second pattern groove 431, and the second sense patterns 440 are easily plated or deposited even when the second pattern groove 431 is provided in a straight line or a plane.

Also, a connection part connected to the wire 403 may be provided on a side of each of the first and second sense patterns 420 and 440. The connection part may be electrically connected to the sense pattern, and may be provided to have a width greater than that of the sense pattern. The connection part may be electrically connected to the wire 403 by solder bonding thereto.

On the other hand, unlike in the drawings, the first and second sense patterns 420 and 440 may be integrally formed with the wires 403. That is, although the first and second sense patterns 420 and 440 illustrated in the drawings are provided only in the touch device 401, the sense patterns may extend to an outer region of the touch device 401 and may be directly connected to the connection pads 404 connected to the circuit board.

Meanwhile, while referring to FIGS. 12 and 21, a method of inputting a touch signal to the gesture input device 210 and the swiping input 220 will be described.

The first and second sense patterns 420 and 440 are provided to cover both the gesture input device 210 located at the center of the touch device 401 and the swiping input 220 located at the outer edge of the touch device 401. That is, the first and second sense patterns 420 and 440 may be provided to extend to the swiping input 220 after passing through the gesture input device 210.

For example, the patterns located on the outermost side among the first and second sense patterns 420 and 440 may be disposed to correspond to the swiping input 220. Therefore, when the mutual capacitance of the first and second sense patterns 420 and 440 located at the outermost side is changed, the controller may recognize that the user touches the swiping input 220. When the mutual capacitance of the patterns other than the patterns located at the outermost side among the first and second sense patterns 420 and 440 is changed, the controller may recognize that the user touches the gesture input device 210.

Since the touch signals are input by distinguishing the gesture input device 210 from the swiping input 220 using the same first and second sense patterns 420 and 440, a manufacturing process may be simplified.

Next a method of manufacturing the touch input device 400 in accordance with the second embodiment of the present disclosure will be described with reference to FIGS. 22 to 29.

Figure 22:
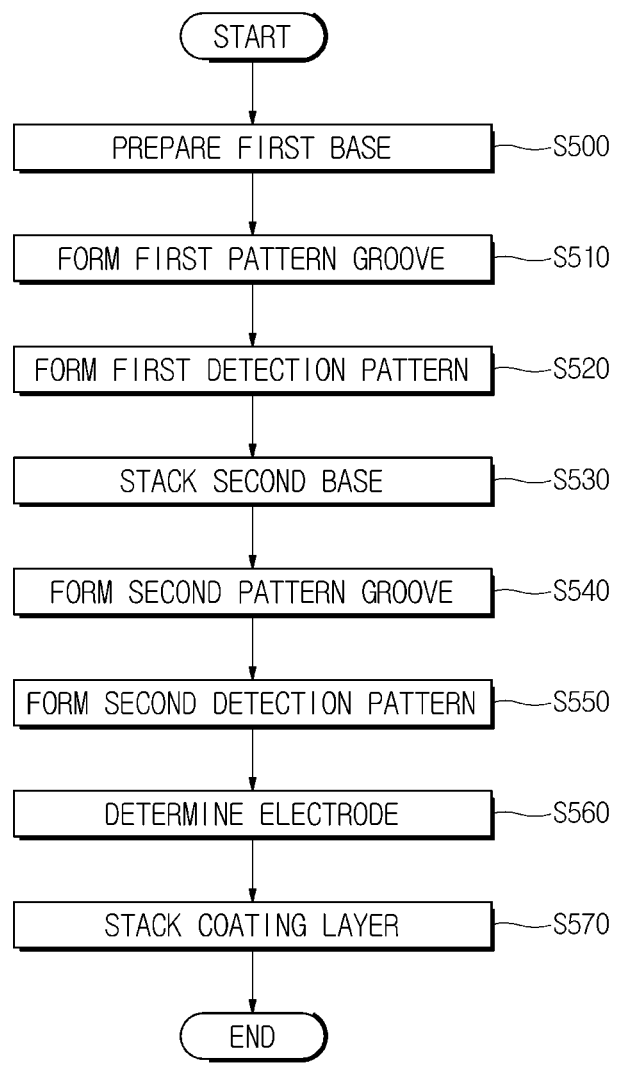
FIG. 22 is a flowchart illustrating a method of manufacturing a touch input device in accordance with the second embodiment of the present disclosure.

FIG. 22 is a flowchart illustrating a method of manufacturing a touch input device 400 in accordance with the second embodiment of the present disclosure. FIGS. 23 to 29 are cross-sectional views illustrating a method of manufacturing a touch input device 400 in accordance with the second embodiment of the present disclosure.

Figure 23:
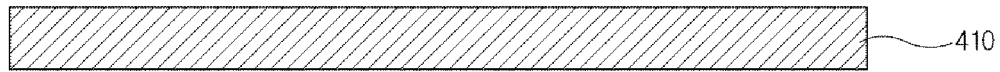
FIGS. 23 to 29 are cross-sectional views illustrating a method of manufacturing a touch input device in accordance with the second embodiment of the present disclosure, where

FIG. 23 is a cross-sectional view illustrating a process of preparing a first base 410 (S500).

The first base 410 may include a metal composite. For example, the first base 410 may be a composite containing a resin and a metal oxide. Here, the resin may contain at least one of polycarbonate (PC), polyamide (PA), and an acrylonitrile-butadiene-styrene (ABS) copolymer, and the metal oxide may contain at least one of Mg, Cr, Cu, Ba, Fe, Ti and Al.

The first base 410 may be formed using an injection method. The first base 410 may be formed by injecting the metal composite, and may be formed by coating a surface of another material such as a plastic, glass or the like with the metal composite.

A curved surface may be formed as a surface of the first base 410. For example, the concave curved surface in a shape of a portion of a spherical surface may be formed as the surface of the first base 410.

Figure 24:

FIG. 24 is a cross-sectional view illustrating a process of forming a first pattern groove 411 (S510).

The first pattern groove 411 is formed by irradiation of a laser such as an ultraviolet (UV) laser or an excimer laser onto the surface of the first base 410. In this case, the chemical bonding of the metal composite is broken by heat generated while forming the grooves to be reduced to metals, and metal seeds are formed in the first pattern groove 411.

The first pattern groove 411 may be formed in the surface of the first base 410 having a curved surface. Since the first pattern groove 411 is formed by irradiation of a laser, patterns having various shapes may be formed regardless of the shape of the surface of the first base 410.

Figure 25:
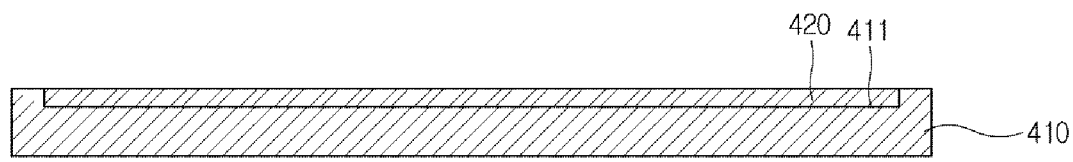

FIG. 25 is a cross-sectional view illustrating a process of forming a first sense pattern 420 (S520).

The first sense pattern 420 may be formed by metalizing the first pattern groove 411 in which a metal seed is exposed. For example, the first sense pattern 420 may include copper (Cu) plating on the first pattern groove 411. Also, nickel (Ni) may be plated on the copper (Cu) plating in order to prevent oxidation.

Figure 26:
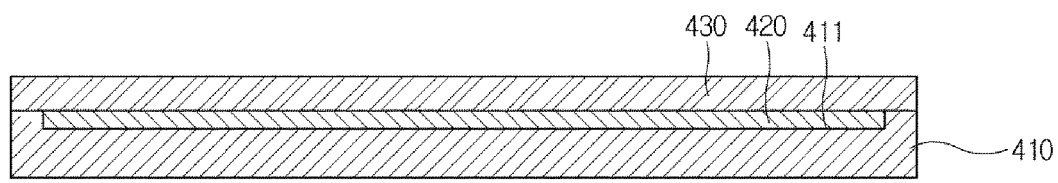
Figure 27:
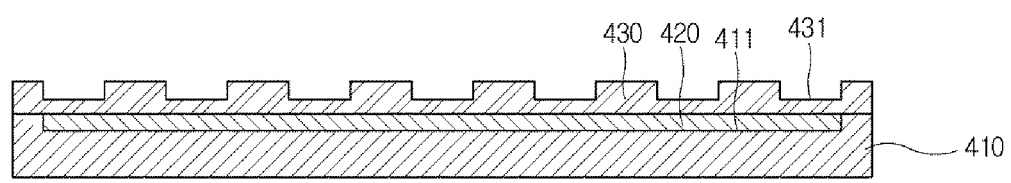
Figure 28:
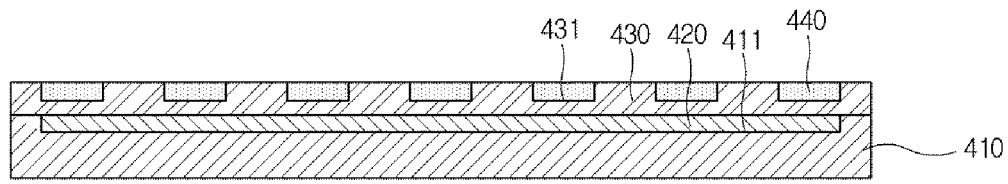

FIG. 26 is a cross-sectional view illustrating a process of stacking a second base 430 (S530), FIG. 27 is a cross-sectional view illustrating a process of forming a second pattern groove 431 (S540), and FIG. 28 is a cross-sectional view illustrating a process of forming a second sense pattern 440 (S550).

As shown in FIGS. 26 to 28, the second base 430 may be provided with a metal composite, and may be coated and formed on the first base 410. In addition, since description in FIGS. 23 to 25 may be applied to the processes illustrated in FIGS. 26 to 28, a repeated description will be omitted.

Meanwhile, after formation of the second base 430, the process for investigating whether the second base 430 has a constant thickness may further be used. In order to measure the thickness of the second base 430, laser light, ultrasound, optical elements and impedance elements may be used.

The process for investigating whether the second base 430 has a constant thickness is a process for investigating whether a distance between the first sense pattern 420 and the second sense pattern 440 is constant or is within the error range, and this process is needed to guarantee a touch performance and functionality.

If the second base 430 has an irregular thickness, the distance between the first sense pattern 420 and the second sense pattern 440 becomes irregular, such that touch sensitivity may be changed according to coordinates.

Figure 29:
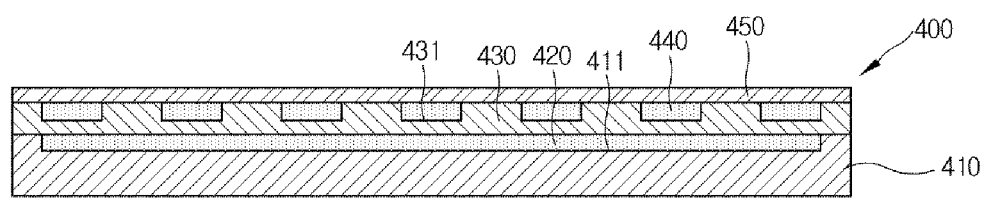

FIG. 29 is a cross-sectional view illustrating a process of stacking a coating layer 450 (S570).

As shown in FIG. 29, the coating layer 450 may be coated and formed on the second base 430 in order to protect the second sense pattern 440 from external impact or contamination. Also, the coating layer 450 may form a touch surface of the touch device 401.

Although not illustrated in the drawings, a method of determining whether the touch input device 400 manufactured by the processes in FIGS. 23 to 29 operates normally or not (S560) may be further included.

The determining process (S560) includes providing a current to the first and second sense patterns 420 and 440, checking a change of the mutual capacitance between the sense patterns, and determining whether the touch input device 400 is usable or not as a sensor. This is because in order for the touch input device 400 to serve as a product, when the input means is in contact with the touch device 401, the mutual capacitance between the first and second sense patterns 420 and 440 is changed, and a position at which the input means touches should be detected by detecting the changed mutual capacitance.

Meanwhile, the determining process (S560) may be performed before the stacking of the coating layer 450 (S570). This is because when it is determined that the touch input device 400 is not usable in the determining process (S560), the case in which the second sense pattern 440 is repaired may occur and be detected.

Figure 30:
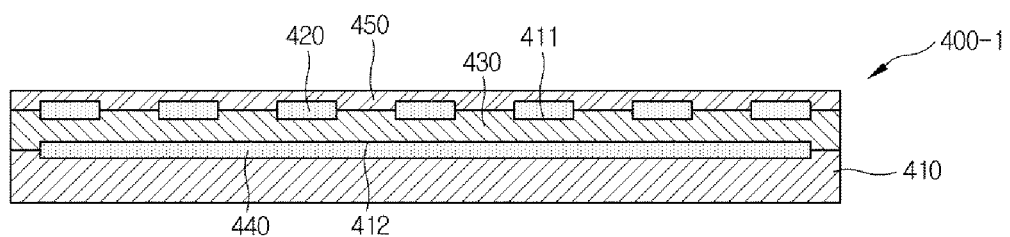
FIG. 30 is a cross-sectional view illustrating a modified example of a touch input device according to the second embodiment of the present disclosure.

FIG. 30 is a cross-sectional view illustrating a modified example 400-1 of a touch input device according to the second embodiment of the present disclosure.

As shown in FIG. 30, the modified example 400-1 of the touch input device according to the first embodiment, some parts of a lower part of the first sense pattern 420 may be included in a first pattern groove 411 of the first base 410, and some parts of an upper part of the first sense pattern 420 may be included in a lower part of the second base 430.

Some parts of the lower part of the second sense pattern 440 may be included in a second pattern groove 431 of the second base 430, and some parts of the upper part of the second sense pattern 440 may be included in a lower part of the coating layer 450.

For example, a half of the first sense pattern 420 may be included in the first pattern groove 411 of the first base 410, and the remaining half of the first sense pattern 420 may be included in the lower part of the second base 430.

In the meantime, if the first or second sense pattern 420 or 440 protrudes from the top surface of the first or second base 410 or 430, this situation may be associated with the first or second sense pattern 420 or 440 formed by LDS processing. If the first or second sense pattern 420 or 440 is formed in the first or second pattern groove 411 or 431 engraved with a laser on one surface of the first or second base 410 or 430 using the plating or deposition process, the lower part of the first or second sense pattern 420 or 440 may be accommodated in the first or second pattern groove 411 or 431 and the upper part of the first or second sense pattern 420 or 440 may protrude from the first or second pattern groove 411 or 431. That is, a separate planarization (e.g., CMP) process may be needed in a manner that one surface of the first or second sense pattern 420 or 440 can achieve the same plane as one surface of the first or second base 410 or 430.

Figure 31:
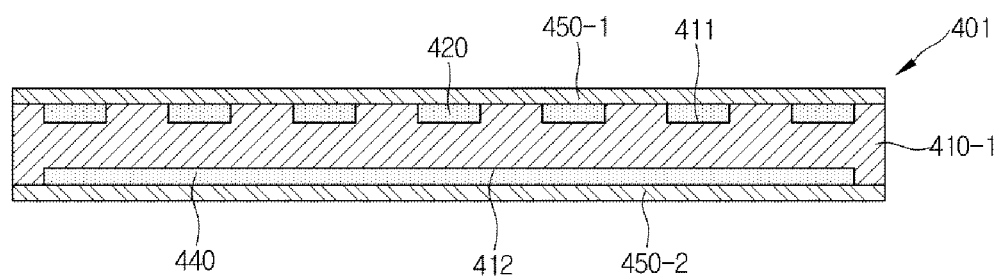
FIG. 31 is a cross-sectional view illustrating a touch input device in accordance with a third embodiment of the present disclosure.

FIG. 31 is a cross-sectional view illustrating a touch input device 400-1 in accordance with a third embodiment of the present disclosure.

As shown in FIG. 31, the touch input device 401 in accordance with the third embodiment of the present disclosure may include a base 411, first pattern grooves 411 formed in a surface of the base 410-1, a second pattern groove 412 formed in a back surface of the base 410-1, first sense patterns 420 plated or deposited in the first pattern grooves 411, second sense patterns 440 plated or deposited in the second pattern groove 412, a first coating layer 450-1 coated on the surface of the base 410-1, and a second coating layer 450-2 coated on the other surface of the base 410-1. At least one of the first coating layer 450-1 and the second coating layer 450-2 may be omitted in some cases.

In the touch input device 401 in accordance with the third embodiment of the present disclosure, the first sense patterns 420 and the second sense patterns 440 may be respectively formed on both sides of the base. That is, since only one base 410-1 is used to form the two-layered sense patterns, a thickness of the touch input device 400-1 may be decreased, and the touch input device 401 may be formed as a slim product.

Figure 32:
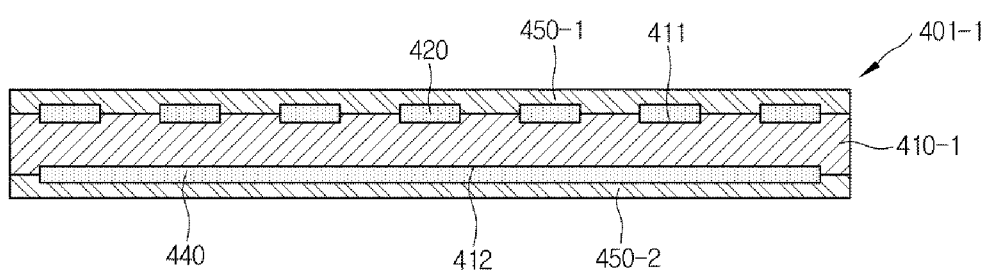
FIG. 32 is a cross-sectional view illustrating a modified example of a touch input device according to the third embodiment of the present disclosure.

FIG. 32 is a cross-sectional view illustrating a modified example 401-1 of a touch input device according to the third embodiment of the present disclosure.

As shown in FIG. 32, the modified example 401-1 of the touch input device according to the second embodiment, some parts of a lower part of the first sense pattern 420 may be included in the first pattern groove 411 of the base 410-1, and some parts of an upper part of the first sense pattern 420 may protrude from the top surface of the base 410-1.

Some parts of the upper part of the second sense pattern 440 may be included in the second pattern groove 412 of the base 410-1, and some parts of the lower part of the second sense pattern 440 may protrude from the bottom surface of the base 410-1.

For example, a half of the first sense pattern 420 may be included in the first pattern groove 411 of the base 410-1, and the remaining half of the first sense pattern 420 may protrude from the top surface of the base 410-1. A half of the second sense pattern 440 may be included in the second pattern groove 412 of the base 410-1, and the remaining half of the second sense pattern 440 may protrude from the bottom surface of the base 410-1.

In the meantime, if the first or second sense pattern 420 or 440 protrudes from the top or bottom surface of the base 410-1, this situation may be associated with the first or second sense pattern 420 or 440 formed by LDS processing. If the first or second sense pattern 420 or 440 is formed in the first or second pattern groove 411 or 412 engraved with laser light on both surfaces of the base 410-1 using the plating or deposition process, some parts of the first or second sense pattern 420 or 440 may be accommodated in the first or second pattern groove 411 or 412, and the remaining parts of the first or second sense pattern 420 or 440 may protrude from the first or second pattern groove 411 or 412. That is, a separate planarization (e.g., CMP) process is needed in a manner that one surface of the first or second sense pattern 420 or 440 can achieve the same plane as one surface of the base 410-1.

Figure 33:
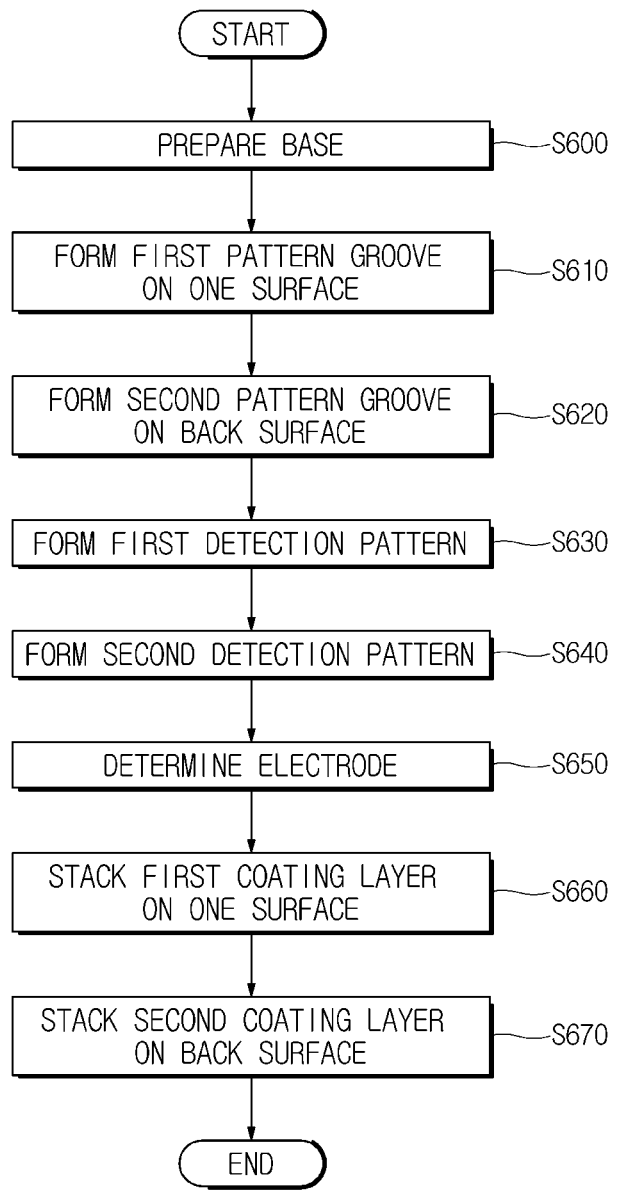
FIG. 33 is a flowchart illustrating a method of manufacturing a touch input device in accordance with the third embodiment of the present disclosure.

FIG. 33 is a flowchart illustrating a method of manufacturing the touch input device 401 in accordance with the third embodiment of the present disclosure.

As shown in FIG. 33, the method of manufacturing the touch input device 401 in accordance with the third embodiment of the present disclosure may include, first, preparing a base 410-1 (S600), forming a first pattern grooves 411 in a surface of the base 410-1 (S610) and turning over the base 410-1, a second pattern groove 412 in a back surface of the base 410-1 (S620), forming first sense patterns 420 by plating or depositing over the first pattern grooves 411 (S630) and second sense patterns 440 by plating or depositing over the second pattern grooves 431 (S640), and stacking a first coating layer 450-1 on the surface of the base 410-1 (S660) to protect the first sense patterns 420, and stacking a second coating layer 450-2 on the other surface of the base 410-1 (S670) to protect the second sense patterns 440.

Alternatively, the forming of the first pattern groove 411 in the surface of the base 410-1 (S610) and the forming of the second pattern groove 412 in the back surface thereof (S630) may be simultaneously or continuously performed. Also, the plating or depositing of the first sense patterns 420 (S620) and the plating or depositing of the second sense patterns 440 (S630) may be simultaneously or continuously performed.

A process of determining whether the first sense pattern 420 and the second sense pattern 440 operate normally or not (S650) may be performed before the stacking of the first and second coating layers 450-1 and 450-2 (S660 and S670).

Figure 34:
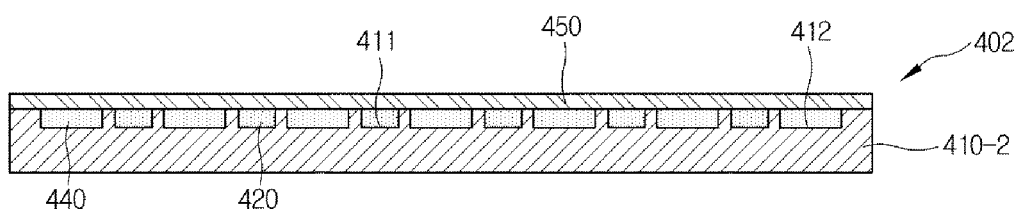
FIG. 34 is a cross-sectional view illustrating a touch input device in accordance with a fourth embodiment of the present disclosure.

FIG. 34 is a cross-sectional view illustrating a method of manufacturing a touch input device 400-2 in accordance with the fourth embodiment of the present disclosure.

As shown in FIG. 34, the touch input device 400-2 in accordance with the fourth embodiment of the present disclosure may include a base 410-2, first pattern grooves 411 and second pattern grooves 412, which are formed in a surface of the base 410-2, first sense patterns 420 plated or deposited in the first pattern grooves 411, second sense patterns 440 plated or deposited in the second pattern grooves 412 and a coating layer 450 coated on the surface of the base 410-2.

In the touch input device 400-2 in accordance with the fourth embodiment of the present disclosure, both the first sense pattern 420 and the second sense pattern 440 may be formed on the surface of the base 410-2. That is, since only one base 410-2 is used to form the two-layered sense patterns, the thickness of the touch input device 400-2 may be decreased and the touch input device 400-2 may be formed as a slim product.

The first sense patterns 420 and the second sense patterns 440 may not be connected to each other, but may be provided spaced apart by a predetermined distance. The first sense patterns 420 and the second sense patterns 440 may be formed not to cross each other. The patterns having various shapes may be provided. For example, a plurality of patterns formed on a surface is disclosed in US Patent Application Publication No. 2015-0234492, which is incorporated herein in its entirety by reference.

Figure 35:
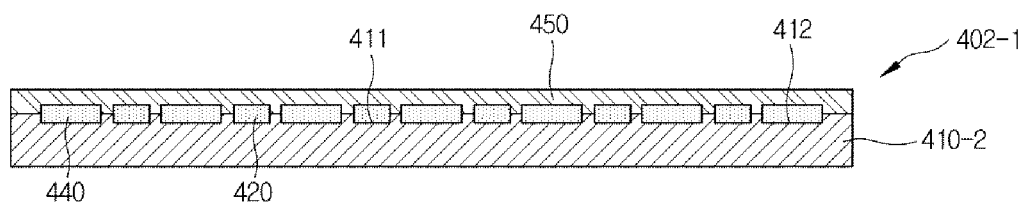
FIG. 35 is a cross-sectional view illustrating a modified example of a touch input device according to the fourth embodiment of the present disclosure.

FIG. 35 is a cross-sectional view illustrating a modified example 402-1 of the touch input device according to the fourth embodiment of the present disclosure.

As shown in the modified example 402-1 of the touch input device according to the third embodiment, some parts of a lower part of the first or second sense pattern 420 or 440 may be included in the first or second pattern groove 411 or 412 of the base 410-2, and some parts of an upper part of the first or second sense pattern 420 or 440 may protrude from the top surface of the base 410-2.

For example, a half of the first or second sense pattern 420 or 440 may be included in the first or second pattern groove 411 or 412 of the base 410-2, and the remaining half of the first or second sense pattern 420 or 440 may protrude from the top surface of the base 410-2.

In the meantime, if the first or second sense pattern 420 or 440 protrudes from the top surface of the base 410-2, this situation may be associated with the first or second sense pattern 420 or 440 formed by LDS processing. If the first or second sense pattern 420 or 440 is formed in the first or second pattern groove 411 or 412 engraved with laser light on one surface of the base 410-2 using the plating or deposition process, some parts of the first or second sense pattern 420 or 440 may be accommodated in the first or second pattern groove 411 or 412, and the remaining parts of the first or second sense pattern 420 or 440 may protrude from the first or second pattern groove 411 or 412. That is, a separate planarization (e.g., CMP) process may be needed in a manner that one surface of the first or second sense pattern 420 or 440 can achieve the same plane as one surface of the base 410-2.

Figure 36:
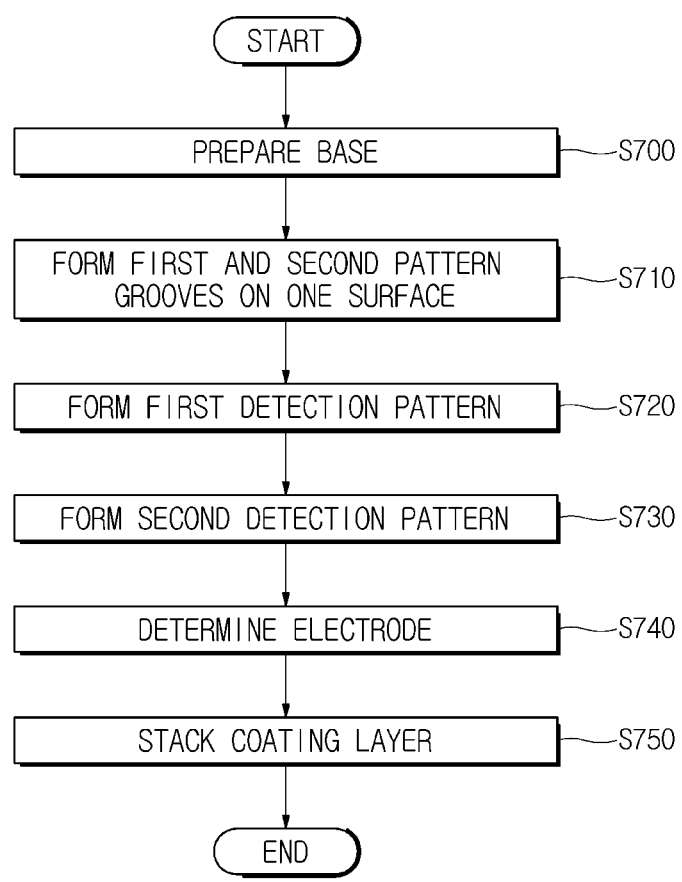
FIG. 36 is a flowchart illustrating a method of manufacturing a touch input device in accordance with the fourth embodiment of the present disclosure.

FIG. 36 is a flowchart illustrating a method of manufacturing a touch input device 400-2 in accordance with the fourth embodiment of the present disclosure.

As shown in FIG. 36, the method of manufacturing the touch input device 400 in accordance with the fourth embodiment of the present disclosure may include, first, preparing a base 410-2 (S700), forming first pattern grooves 411 and second pattern grooves 412 in a surface of the base 410-2 (S710), plating or depositing and forming first sense patterns 420 in the first pattern grooves 411 (S720), plating or depositing and forming second sense patterns 440 in the second pattern grooves 412 (S730), and stacking a coating layer 450 on the surface of the base 410-2 (S750) to protect the first and second sense patterns 420 and 440.

A process of determining whether the first sense patterns 420 and the second sense patterns 440 operate normally or not (S740) may be performed before the stacking of the coating layer 450 (S750).

Figure 37:
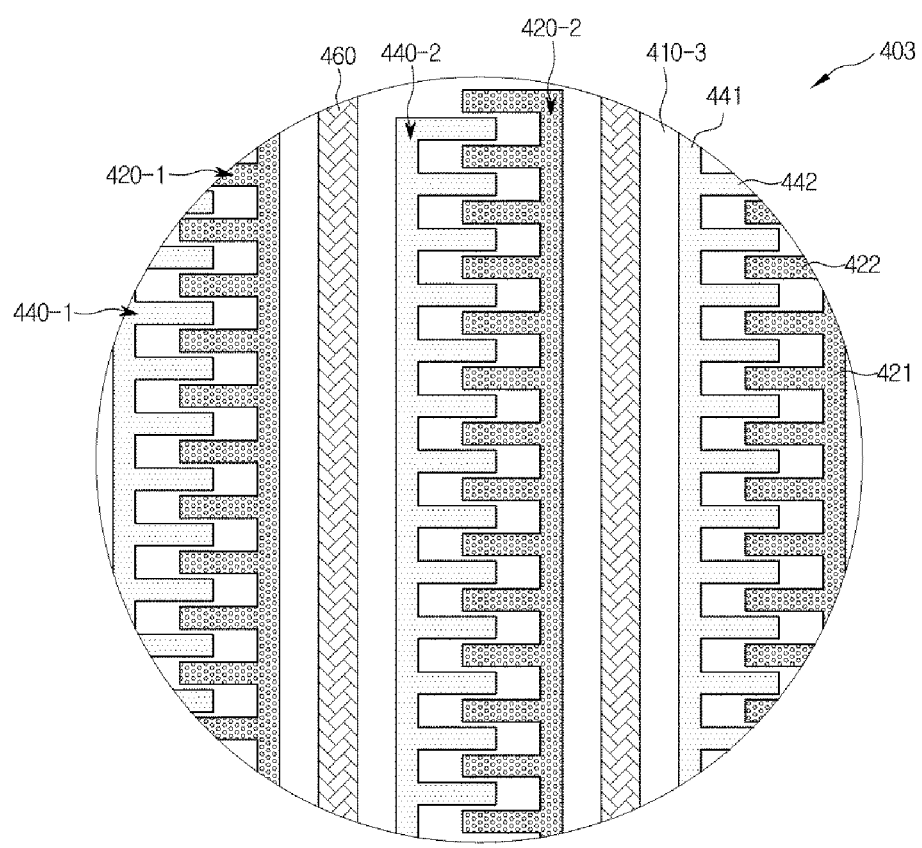
FIG. 37 is a plan view illustrating sense patterns of a touch input device according to a fifth embodiment of the present disclosure.

FIG. 37 is a plan, or top, view illustrating sense patterns of the touch input device 403 according to a fourth embodiment of the present disclosure.

As shown in FIG. 37, the touch input device 403 according to the fourth embodiment may include a first sense pattern 420 (420-1, 420-2) formed in the first pattern groove 411 formed at one surface of the base 410-3, and a second sense pattern 440 (440-1, 440-2) formed in the second pattern groove 412 formed at one surface of the base 410-3.

Each of the first sense pattern 420 and the second sense pattern 440 may include a plurality of columns. A column of one first sense pattern 420 and a column of one second sense pattern 440 adjacent to the first sense pattern 420 may form a single channel, and columns of the plurality of first and second sense patterns (420, 440) may form a plurality of channels.

For example, the first sense pattern 420 may include the (n−1)-th first sense pattern 420-1 and the n-th first sense pattern 420-2. The second sense pattern 440 may include not only the (n−1)-th second sense pattern 440-1 adjacent to the (n−1)-th first sense pattern 420-1, but also the n-th second sense pattern 440-2 adjacent to the n-th first sense pattern 420-2.

The first sense pattern 420 may include a trunk part 421 extending in one direction and a plurality of leg parts 422 branched in a direction perpendicular to the trunk part 421. The second sense pattern 440 may include a trunk part 441 extending in one direction and a plurality of leg parts 442 branched in a direction perpendicular to the trunk part 441. The leg parts 422 of the first sense pattern 420 and the leg parts 442 of the second sense pattern 440 may be arranged to face each other. The leg parts 442 of the plurality of second sense patterns 440 may be disposed between the leg parts 422 of the plurality of first sense patterns 420.

The touch input device 403 may include a ground line 460 disposed between the respective channels. Although not shown in the drawings, the ground line 460 may be provided in the ground pattern groove (not shown) formed at one surface of the base 410-3. The ground pattern groove may be formed by irradiating laser light and the ground line 460 may be formed by the plating or deposition process.

That is, the ground line 460 may be formed using the same LDS scheme as in the first and second sense patterns (420, 440). In addition, the ground pattern groove may be formed by the same process as in the first and second pattern grooves (411, 412), and the ground line 460 may be formed by the same process as in the first and second sense patterns (420, 440).

The ground line 460 may be a ground (GND) electrode line. The ground line 460 may prevent an occurrence of noise between adjacent channels. For example, the ground line 460 may prevent delivery of noise between the (n−1)-th first sense pattern 420-1 and the n-th second sense pattern 440-2.

The ground line 460 may be disposed between the first sense pattern 420 and the second sense patter 440 of different channels. For example, the ground line 460 may be arranged between the (n−1)-th first sense pattern 420-1 and the n-th second sense pattern 440-2. The ground line 160 may extend in a direction parallel to one direction along which the trunk parts (421, 441) of the first and second sense patterns (420, 440) are elongated.

In one aspect, the touch input device of the touch input device in accordance with the embodiment of the present disclosure includes a concave shape (recessed or depressed shape), and thus the sense of operation and sense of touch when a user enters a gesture can be improved. Further, as the shape of the touch input device is ergonomically designed, strain on the wrist or back joints of the hand may not be caused even when the user uses the touch input device for a long period of time.

Also, as the touch input device is formed lower than the periphery thereof, the touch region may be intuitively known even without the user looking at the touch input device, and thus the recognition rate of the gesture can be improved.

Also, as the touch input device includes a concave curved surface, even when the touch input device is used in a state in which the user is not focusing his or her eyes on the touch input device, that is, in a state in which the user looks at the display or watches a front of the vehicle, the user may intuitively know that a position of a region of the touch input device at which the finger is located by the gradient felt by the finger.

Therefore, the user may easily enter the gesture while looking the display device without looking at the touch input device to enter the gesture and the user may enter a precise gesture at an accurate position. Thus the recognition rate of the gesture can be improved.

Specifically, when the touch input device in accordance with an embodiment of the present disclosure is applied to a vehicle, the user can accurately input a gesture while maintaining the forward gaze in a direction forward of the vehicle when the driver manipulates a navigation device, an audio device or the like while driving.

Also, the swiping input is provided on the periphery of the gesture input device, and thus can replace the physically rotating dialing function. In addition, the swiping input can recognize various touch gestures, and thus various functions which are improved more than the dialing function can be performed.

Also, gradations for detection the sense of touch are displayed on the swiping input, and thus the user may intuitively know a swiping angle (or distance). Therefore, different signals may be input according to the swiping angle, and thus the degree of freedom of operation can be further improved and the input accuracy can be improved.

Also, as the gradient of the gesture input device is different from that of the swiping input, the user can intuitively distinguish the gesture input device from the swiping input by touching.

Also, as the touch input device is provided to be pressed in multiple directions and performs a different function according to the pressed direction, it is possible to quickly perform a command.

In another aspect, since the touch input device in accordance with the embodiment of the present disclosure is manufactured using an LDS method, the manufacturing processes thereof can be simplified and process costs thereof can be reduced.

Also, the sense patterns can be easily formed even when the touch device is provided to have a curved surface. Specifically, the sense patterns can be formed even when the touch device is provided to have a multi-curved surface.

Also, a bonding method is not used when the sense patterns are formed on a base, and thus the device may be protected from vibration and shock and the durability thereof can be improved.

Also, the device may be manufactured under a high-temperature condition in which a laser is used, and thus, the reliability can be improved even when the device is used in a high-temperature environment.

While the disclosure has been described with reference to exemplary embodiments illustrated in accompanying drawings, these should be considered in a descriptive sense only, and it will be understood by those skilled in the art that various modifications and equivalent other embodiments may be made. Therefore, the scope of the disclosure is defined by the appended claims.

What is claimed is:

1. A touch input device comprising a touch device with which a user is capable of inputting a touch gesture, wherein the touch device includes:
    a base, of which a surface has a concave shape, wherein a depth of the base gradually increases from an outer portion of the touch device toward a center portion of the touch device;
    a pattern groove concavely formed along the surface of the base so that a depth of the pattern groove gradually increases from the outer portion toward the center portion;
    a sense pattern provided in the pattern groove and including a conductive material;
    a wire for connecting the sense pattern to an integrated circuit; and
    a coating layer stacked on the base.

2. The device according to claim 1, wherein the base includes a metal composite.

3. The device according to claim 1, wherein:
    the base includes a first base and a second base stacked thereon;
    the pattern groove includes a first pattern groove formed in a surface of the first base and a second pattern groove formed in a surface of the second base; and
    the sense pattern includes a first sense pattern provided in the first pattern groove and a second sense pattern provided in the second pattern groove.

4. The device according to claim 3, wherein the first pattern groove and the second pattern groove vertically cross with the second base therebetween.

5. The device according to claim 2, wherein the base includes a resin containing at least one of polycarbonate (PC), polyamide (PA), and an acrylonitrile-butadiene-styrene (ABS) copolymer and a metal oxide containing at least one of Mg, Cr, Cu, Ba, Fe, Ti and Al.

6. The device according to claim 5, wherein the base is coated on a plastic or a glass.

7. The device according to claim 1, wherein:
    the pattern groove includes a first pattern groove formed in a surface of the base and a second pattern groove formed in a back surface of the base; and
    the sense pattern includes a first sense pattern provided in the first pattern groove and a second sense pattern provided in the second pattern groove.

8. The device according to claim 1, wherein:
    the pattern groove includes a first pattern groove and a second pattern groove, which are formed in the surface of the base;
    the sense pattern includes a first sense pattern provided in the first pattern groove and a second sense pattern provided in the second pattern groove; and
    the first sense pattern and the second sense pattern are disposed spaced apart from each other.

9. The device according to claim 1, wherein the touch device includes a concave curved surface shape, of which a gradient is decreased toward a center portion thereof.

10. The device according to claim 1, wherein the base includes a shape of a portion of a spherical surface.

11. The device according to claim 1, wherein the touch device includes:
    a gesture input device located at a center thereof; and
    a swiping input device located along an outer edge of the gesture input device,
    wherein the gesture input device and the swiping input receive separate touch signals.

12. The device according to claim 11, wherein:
the gesture input device has a circular shape; and
the swiping input device surrounds a circumferential rim of the gesture input device.

13. The device according to claim 12, wherein the swiping input device is inclined downward toward the gesture input device.

14. The device according to claim 11, wherein the gesture input device and the swiping input device are integrally formed.

15. The device according to claim 11, wherein the sense pattern is covers the gesture input device and the swiping input device.

16. The device according to claim 11, wherein:
the gesture input device and the swiping input device receive a touch signal using the same sense pattern; and
signals are separately recognized based on a boundary between the gesture input device and the swiping input.

17. A vehicle, comprising:
the touch input device according to claim 1;
a display device; and
a controller for operating the display device according to an input signal input to the touch input device.

18. The vehicle according to claim 17, wherein the controller converts a gesture input to the touch input device into an input signal, and transmits an operation signal such that an operation indicated by the input signal is displayed on the display device.

19. The vehicle according to claim 17, wherein the touch input device is installed in a gearbox.

* * * * *